United States Patent [19]

Parkes et al.

[11] Patent Number: 4,750,273
[45] Date of Patent: * Jun. 14, 1988

[54] COMPUTER CONTROLLED GRAIN DRYING

[75] Inventors: Donald H. Parkes, Lamoni; Steven D. Shivvers, Corydon, both of Iowa

[73] Assignee: Shivvers Inc., Corydon, Iowa

[*] Notice: The portion of the term of this patent subsequent to Jul. 15, 2003 has been disclaimed.

[21] Appl. No.: 885,059

[22] Filed: Jul. 14, 1986

Related U.S. Application Data

[63] Continuation-in-part of Ser. No. 650,677, Sep. 13, 1984, Pat. No. 4,599,809.

[51] Int. Cl.$^4$ .............................................. F26B 21/10
[52] U.S. Cl. .......................................... 34/30; 34/31; 34/48; 34/56
[58] Field of Search ...................... 34/48, 56, 233, 46, 34/31, 30

[56] References Cited

U.S. PATENT DOCUMENTS

| | | |
|---|---|---|
| 2,855,697 | 10/1958 | Barre . |
| 3,068,404 | 12/1962 | Moore et al. . |
| 3,081,429 | 3/1963 | Moe . |
| 3,090,004 | 5/1963 | Breen et al. . |
| 3,141,129 | 7/1964 | Dietert . |
| 3,559,052 | 1/1971 | Fathauer . |
| 3,563,399 | 2/1971 | Shivvers . |
| 3,636,638 | 1/1972 | Noyes . |
| 3,681,685 | 8/1972 | Tarry et al. . |
| 3,691,457 | 9/1972 | Kriellaars . |
| 3,714,718 | 2/1973 | Sukup . |
| 3,714,818 | 2/1973 | Relph . |
| 3,736,667 | 6/1973 | McClaren . |
| 3,743,930 | 7/1973 | Fathauer . |
| 3,761,810 | 9/1973 | Fathauer . |
| 3,765,547 | 10/1973 | Shivvers . |
| 3,765,548 | 10/1973 | Shivvers . |
| 3,794,911 | 2/1974 | Fathauer . |
| 3,861,054 | 1/1975 | Stahl . |
| 3,946,496 | 3/1976 | Sukup . |
| 4,004,351 | 1/1977 | Danneman et al. . |
| 4,152,840 | 5/1979 | Stille ........................................ 34/56 |
| 4,217,701 | 8/1980 | Mathews . |
| 4,253,243 | 3/1981 | Whelan ..................................... 34/48 |
| 4,253,244 | 3/1981 | Kranzler ................................... 34/48 |

OTHER PUBLICATIONS

ASAE Paper; 80-5522; Singleton et al.; Dec. 2, 1980.
ASAE Paper; 82-3009; Wafler et al.; Jun. 27, 1982.
ASAE Paper; 82-6006; Borsum et al.; Jun. 27, 1982.
ASAE Paper; 83-3031; Smith et al.; Jun. 26, 1983.
Masters Degree Thesis; 1317695; Borsum; 1981.
Brochure; Insto Moisture Tester; Insto, Inc.; Aug. 1977.
Brochure; Moisture Monitors; Dickey-John Corp.; date unknown.
Brochure; Control Systems; Dickey-John Corp.; date unknown.
Brochure; Moisture Tester; Dickey-John Corp.; date unknown.
Brochure; Sweat Drying, Beard Industries, date unknown.
Brochure, Energy Miser, Beard Industries, date unknown.
Brochure, Behlen Batch, Behlen Mfg. Co., date unknown.
Brochure, Fantastic 1000, Behlen Mfg. Co., date unknown.
Kan-Sun Brochure, Butler Mfg. Co., date unknown.
Brochure, Meyer Morton Co., Meyer Dryers, date unknown.
Brochure, M & W Batch, M & W, date unknown.
Brochure, M & W Concurrent, M & W, date unknown.

Primary Examiner—Larry F. Schwartz
Attorney, Agent, or Firm—Litman McMahon & Brown

[57] ABSTRACT

A computer controlled grain dryer system includes a grain drying chamber, an air heater unit, and an arrangement of grain loading and unloading conveyors. A grain moisture sampling system receives a grain sample from the grain chamber and conveys the sample to a capacitive sample cell. A grain moisture meter measures grain moisture content as a function of the dielectric constant of the sample in the cell. A digital computer is interfaced with the moisture meter and the grain conveyor and is programmed to automatically control the grain sampling and the drying process. In continuous crossflow and concurrent flow dryers, the drying process is controlled by controlling the speed of grain flow. In batch type dryers, the process is controlled by way of the time that the grain is present in the drying chamber.

55 Claims, 7 Drawing Sheets

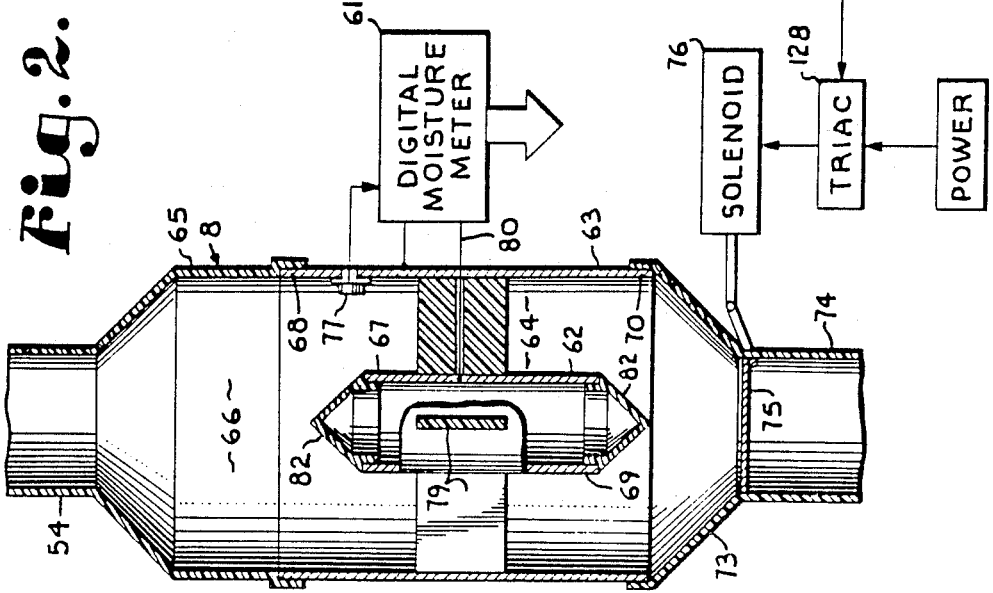

COMPUTER CONTROLLED GRAIN DRYING

CROSS-REFERENCE TO RELATED APPLICATION

This is a continuation-in-part of application Ser. No. 650,677, filed Sept. 13, 1984, entitled GRAIN DRYER SYSTEM, which is now U.S. Pat. No. 4,599,809.

FIELD OF THE INVENTION

The present invention relates to grain dryer systems and, more particularly, to a computer controlled grain dryer system which operates in response to the measured moisture content of the grain to be dried or being dried.

BACKGROUND OF THE INVENTION

The moisture content of freshly harvested grain is too high for storage right away. The moisture content must be lowered before storage to prevent spoilage. For corn, a moisture content of 17 to 18 percent is considered the maximum desirable moisture content for short term storage. A moisture content of 15.5 percent is considered optimum by commercial grain elevator operators. For long term storage of the grain, 14 percent is preferred to retard spoilage. The removal of too much moisture is wasteful of drying energy and usually results in shrinkage which decreases the sale value of the grain. If the moisture is removed too rapidly, damage to the grain results.

There are a number of types of grain dryers in current use of which two major types are the continuous flow type and the batch dryer type. In a continuous flow grain dryer, grain is processed substantially continuously. Generally, large volumes of air at relatively high temperatures are passed through grain in a drying chamber or column. However, heat damage to the grain is minimized by the short stay of the grain in the chamber. Continuous flow dryers are classed as concurrent flow, cross flow, or counter flow dryers depending on the relationship between the directions of grain flow and air flow through the drying chamber. Continuous flow grain drying is capable of high rates of grain processing; however, the energy efficiency of such drying in most cases is not optimum because the drying air does not become saturated with moisture from the grain because of the high flow rate of the drying air. In more modern continuous flow grain dryers, at least a portion of the nonsaturated air is recycled through the burner before exhausting into the atmosphere to increase energy efficiency. Most commercial grain drying operations employ continuous flow systems. In addition, a fair number of individual farmers use continuous flow types of dryers.

In batch grain dryers, as the name suggests, a quantity of grain is loaded into a chamber, usually a drying bin; and heated air is passed through the grain until it is dryed. In general, it is necessary to remove dried grain in the lower layer of the bin or recirculate it to the top of the bin to prevent overdrying of the lower layer. Batch type grain drying is capable of high energy efficiency because the drying air is usually saturated with moisture from the grain before leaving the bin. However, the grain processing rates achievable in batch dryers is lower than in continuous flow dryers such that, currently, batch type drying is usually restricted to smaller operations. Batch type dryers are usually counterflow or crossflow dryers.

In most types of grain drying methods of the past, constant attention of operators was required for sampling moisture content, monitoring of temperature sensors, control of grain flow rates, and the like. Attempts have been made in the recent past to automate grain drying operations. Attempts at controlling grain drying operations through classic automatic control methods have met with varying success for a number of reasons including the diversity of types of grain drying equipment, varying environmental conditions in which such equipment is operated, difficulties in accurately characterizing the operation of grain drying, and other factors.

In the more recent past, attempts have been made to apply digital computers to the task of controlling grain drying operations. The number of variable factors which was a problem in the classic control approach continues to be a problem in the approach employed by the majority of computer controlled drying systems. This appears to be particularly true for systems in which the grain moisture content is determined indirectly by temperature measurements. The placement of temperature sensors in such systems for meaningful temperature measurements and the isolation of such sensors from environmental variables has also been a problem. For example, the placement of temperature sensors in grain unloading auger tubes has caused problems because of clogging of the tubes and damage to the sensors caused by the abrasive action of the grain passing through the tube.

Generally, moisture measurements made by measuring the dielectric constant of a grain sample in a capacitive moisture meter cell are simpler than moisture measurements based on grain or air temperatures. However, one problem with such cells as configured in the past has been that a precise volume or weight of grain is required for accurate measurements. For this reason, such capacitive moisture meters have tended to require manual loading of the grain sample in combination with complex sample size compensation techniques. For these reasons, it has generally been felt that the automatic control of grain drying operations based on capacitive moisture content measurement is not workable.

SUMMARY OF THE INVENTION

The present invention provides an automatic control arrangement for grain drying based on capacitive moisture content measurement. The drying equipment generally includes a grain container which may be a grain chamber or a grain column, an air heater unit including a burner and a blower, and grain conveyors to move the grain into, through, and out of the grain container. Temperature sensors provide signals for optimizing the drying operation. A grain sampling subsystem for grain moisture content draws grain out of the grain container and deposits it in a capacitive sample cell. The grain may either be fed to the sample cell by gravity or more positively by pneumatic means. The grain sample cell is configured such that it is always overfilled for measurements such that precise measuring of sample sizes is not required. The temperature sensors, capacitive grain moisture meter, conveyor motors, burner valves, and heater blower fans are all interfaced to a digital computer. A starting air temperature and a maximum temperature limit are entered into the computer along with the desired moisture content. The computer is programmed to operate the drying system to dry the grain within the set parameters, to monitor the system for malfunctions, to respond to such problems as by correcting the problem if possible or by shutting the system down and sounding an alarm, and to print out reports of the operation. The drying process is controlled to provide a desired output grain moisture content by controlling the removal of the excess percentage of moisture as measured by the grain moisture meter. The precise point in the process where the grain moisture content is measured is not critical if the drying rate between such point and the end of the process is known and if the grain moisture content is accurately measured. In a continuous dryer, the process is usually controlled by controlling the speed of removal of the grain from the drying zone. In a batch dryer, the process is usually controlled in terms of a drying period of time after which a grain conveyor is actuated to remove grain from the dryer. The system is capable of reliable operation without the frequent attention of an operator and is characterized by a high output and high quality of the processed grain.

OBJECTS OF THE INVENTION

The principal objects of the present invention are: to provide an improved grain drying system; to provide such a system which results in a superior grain product which has a high uniformity of the desired moisture content; to provide a grain dryer control system which controls the grain drying equipment in response to the measured grain moisture content and unloads the grain when the moisture content reaches a desired level in a batch type dryer and which increases or decreases the grain flow rate in relation to the measured grain moisture content in a continuous type dryer; to provide such a system wherein a startup drying air temperature and a maximum air temperature and the desired grain moisture content are set by an operator and are monitored by the control system to optimize the drying operation; to provide such a system which automatically loads a grain moisture meter sample cell and measures the grain moisture content as a function of the dielectric constant of the grain; to provide an embodiment of such a system which returns the moisture meter grain sample to the drying chamber; to provide such a system which prints a record of the grain drying operation; to provide such a system which monitors various parameters of the grain drying system and which controls the process in response to such parameters; to provide such a system which will function reliably without frequent human intervention; to provide such a system which includes a digital computer; to provide such a control system which averages the moisture content readings and which adjusts the temperature of the drying air in response to the relationship of each individual reading to the current average to expedite the processing of grain through the drying system and to avoid damage to heat sensitive grains; to provide such a control system which is adaptable to many types of existing grain drying systems including counterflow, crossflow, and concurrent flow dryers of batch and continuous types; and to provide such a grain drying system which is economical to manufacture, reliable and energy efficient in operation, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 2 is a diagramatic sectional view of a moisture meter sample cell according to the present invention.

FIG. 3 is a simplified block diagram of the control system according to the present invention.

FIG. 4 is a side elevational view of a motorized slide gate for gravity feeding grain to the moisture meter sample cell according to the present invention.

DETAILED DESCRIPTION OF THE PREFERRED EMBODIMENT

Figure 1:
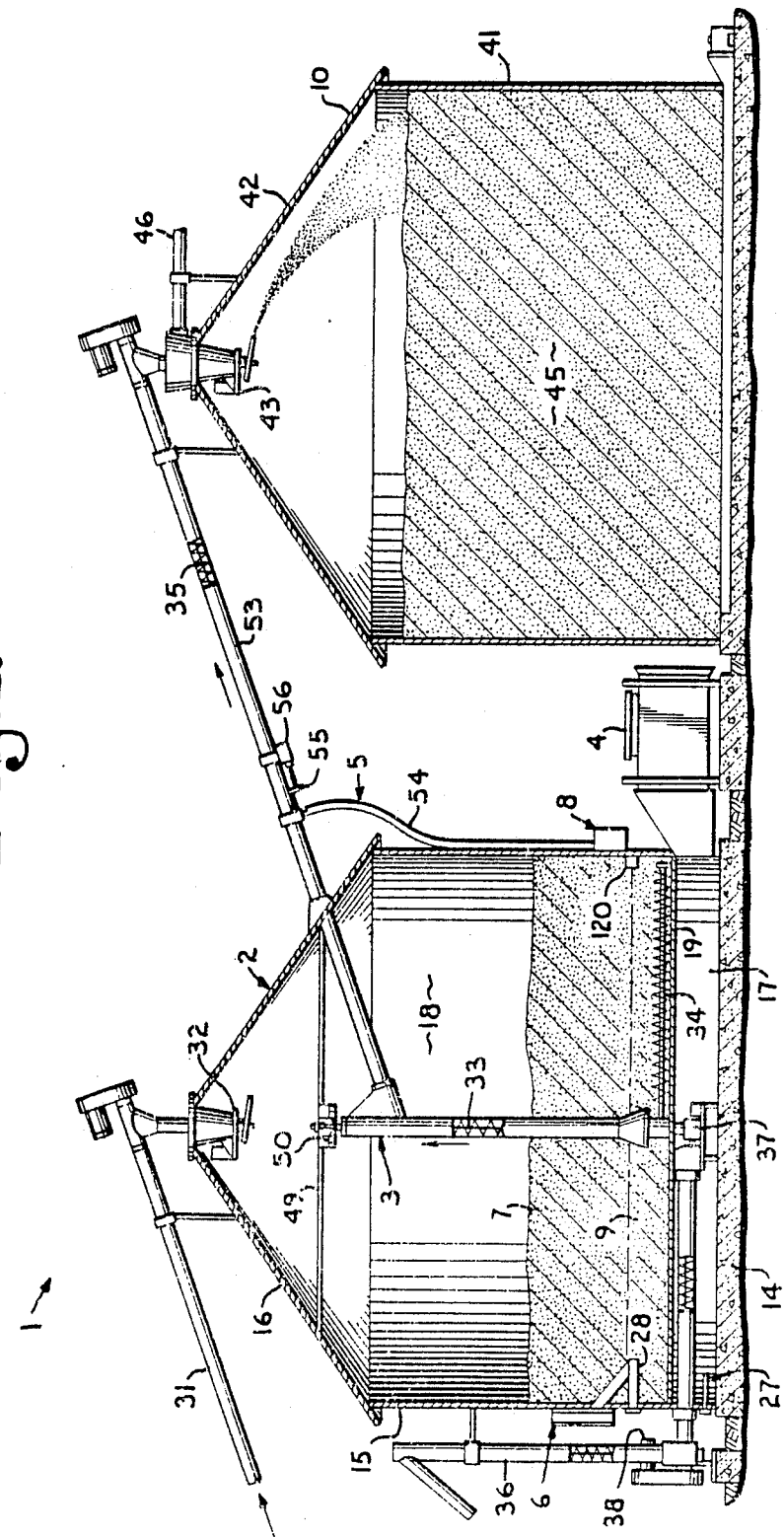
FIG. 1 is a sectional view of a pair of grain bins in which a grain drying system according to the present invention is installed.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a computer controlled grain drying system according to the present invention. The exemplary grain dryer system 1 generally includes a grain drying bin 2, grain conveying means such as bin unloading augers 3, an air heater and blower unit 4, a grain moisture meter sampling system 5, and a grain dryer controller or control computer 6 (FIG. 3). A quantity of wet grain 7 is loaded into the bin 2, and heated air from the unit 4 is passed through the wet grain to dry same. Periodically, the grain is withdrawn from the unloader augers 3 for loading into a sample cell or chamber 8 of the grain sample system 5.

The moisture content of the sample is measured; and in response to the measured moisture content, either the drying process is continued or the lower layer or drying zone 9 of the grain in the bin 2 is transferred out of the bin 2 and into, for example, a grain storage bin 10.

The term "grain" as used herein is meant to encompass not only cereal grains such as corn, wheat, rice, seed grains and the like but also other granular type materials having physical characteristics similar to such grains such as beans, coffee beans, nuts, dry dog food and other such materials, both food and non-food. The "grain" drying systems of the present invention are suitable for drying such materials with minor modifications according to the specific material.

The grain dryer bin 2 is a conventional type of grain bin including a base 14, as of concrete, an upstanding cylindrical wall 15, and a frusto-conical roof 16. Although not illustrated, the wall 15 is preferably of a double wall construction for insulation purposes. Internally, the bin 2 has a lower air distribution plenum 17 and an upper grain drying chamber 18. The plenum 17 is separated from the chamber 18 by a perforated floor 19 which supports the grain 7 within the chamber 18. The walls 15, roof 16, and floor 19 are constructed of sheet metal, the outer wall 15, at least, being preferably corrugated for strength.

Figure 5:
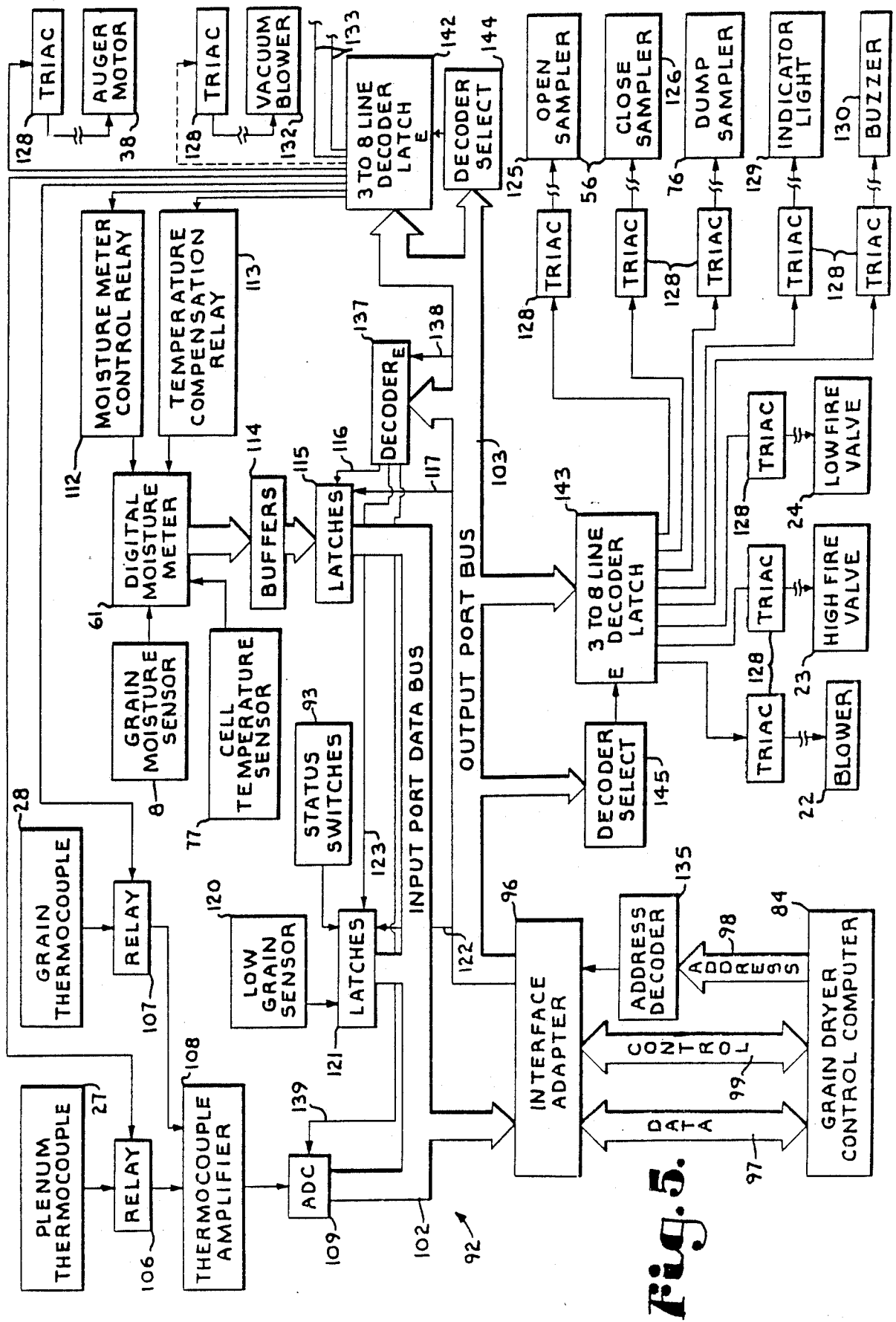
FIG. 5 is a block diagram illustrating the principal computer interface of the control system.

The heater-blower unit 4 communicates with the plenum 17. The unit 4 is conventional and includes a fuel burner which cooperates with a fan or blower 22 (FIG. 5) to heat air. The heater unit includes fuel valves to control the flow of fuel such as natural gas or the like to the burner; and the illustrated unit 4 includes a high fire valve 23 and a low fire valve 24 (FIG. 5). Other types of valving arrangements such as modulating, proportioning, throttling valves, or the like could also be employed. The unit 4 is operative to heat air which is propelled by the blower 22 into the plenum 17. The heated air expands upon entry into the plenum 17 and is forced into the grain chamber 18 by the blower 22. The drying action occurs in the drying zone or lower layer of grain 9 with the upper levels receiving virtually no drying action because of saturation of the air with moisture from grain in the drying zone 9. In order to monitor the drying process, the plenum 17 is provided with a plenum air temperature sensor 27, and the chamber 18 may be provided with a grain temperature sensor 28 which is located to sense the temperature of the lower layer of grain 9. A grain temperature sensor would be desirable in a rice dryer because of the greater sensitivity of rice than other grains to damage from overheating. The blower 22 may be capable of operating independently of the burner portion of the unit 4 such that the temperature of the grain within the bin 2 can be controlled by heating to the maximum desired temperature and, if necessary, operating the blower 22 to cool the grain. Such action is desirable when drying a final load of grain which will remain in the bin 2 to prevent spoilage of the grain which would be accelerated because of the elevated temperature.

The grain drying bin 2 is loaded with grain by the grain conveyor means including, specifically, a bin loading auger 31 mounted on the roof 16 of the bin 2. The auger 31 transfers the incoming grain to a rotary grain spreader unit 32 positioned on the inside of the apex of the conical roof 16 for even distribution of the grain about the grain chamber 18. Grain is unloaded from the bin 2 by the unloading augers 3 which include a center vertical auger 33, a sweep auger 34, and a distribution auger 35 which propels the dried grain to storage bins such as the bin 10. The bin 2 may include an auxiliary unloading auger 36 for unloading the grain directly into trucks or the like. The illustrated augers 33, 34, and 36 are all interconnected by a gearbox 37 such that these augers can be driven by a single motor 38.

The grain storage bin 10 is constructed in a manner generally similar to the dryer bin 2. The illustrated storage bin 10 includes a cylindrical wall 41, a conical roof 42, and a rotary grain spreader 43. The spreader 43 communicates with the distribution auger 35 to receive dried grain 45 from the bin 2. Preferably, the auger 35 connects with additional distribution augers 46 for distribution of the dried grain from the bin 2 to other storage bins (not shown). An arrangement of valves or gates (not shown) at the connection of the distribution augers and grain spreaders allows the selection of the particular storage bin to which the dried grain will be sent.

The sweep auger 34 is positioned horizontally near the floor 19 of the bin 2 and radial to the vertical auger 33. The sweep auger 34 is rotated about its helical axis and is revolved about the axis of the auger 33 to thereby "sweep" the lower layer of grain 9 from the floor and toward the vertical auger 33. The vertical auger 35 is supported in part by the casing of the gearbox 37 and additionally by a chain spider 49 attached to the roof 16. The auger 33 may include a recirculation spreader 50 located at its top end for use in a recirculation drying mode.

The grain sampling system 5 illustrated in FIGS. 1 and 4 communicates with the enclosing tube 53 of the distribution auger 35. A grain sample conduit 54 extends between the tube 53 and the sample cell 8. A motorized sample valve 55 may be opened or closed to allow grain to feed by gravity from the tube 53 to the cell 8. The illustrated valve 55 is actuated by a rotary electric motor 56 having a threaded shaft 57 engaging a nut 58 fixed to the valve 55. The motor 56 is supported on the auger tube 53 and is interfaced with the control computer 6 to provide for automatic grain sampling. The sampling arrangement shown in FIGS. 1 and 4 is exemplary, and other automatic sampling arrangements may be employed without departing from the spirit of the present invention.

FIG. 2 illustrates an embodiment of the moisture meter sample cell 8 of the present invention. In general, the cell 8 is a cylindrical capacitor to which is connected a capacitive digital moisture meter 61 of conventional design. The cell 8 includes an inner conductive cylindrical electrode 62 positioned coaxially within an outer conductive cylindrical electrode 63, thereby defining an annular active region 64 of the cell 8. The capacitance of the cell 8, as measured by the meter 61, is varied by the dielectric constant of any material which is present in the active region 64 of the cell 8. The amount of moisture in a sample of grain determines, for the most part, the dielectric constant of the grain sample, whereby the moisture meter 61 is operative to relate the moisture content of a sample of grain to the capacitance of the cell 8 with the sample therein. A digital moisture meter circuit which is particularly well adapted for use in the grain dryer system 1 is disclosed in U.S. Pat. No. 3,794,911.

The sample cell 8 is constructed to avoid the necessity of providing precise volumes or weights of grain samples, which arises because of electric field fringe effects which occur at the ends of the electrodes of sample cells normally used with meters such as the moisture meter 61. These effects would cause inaccurate moisture readings in sample cells sometimes heretofore employed unless precise volumes of grain were loaded into the cell. In the sample cell 8 of the system 1, a nonconductive cylindrical wall 65 extends above the outer electrode 63 such that an inactive region 66 of the cell 8 is defined thereby which extends well above the fringe region at the upper ends 67 and 68 respectively of the inner and outer electrodes 62 and 63. At the lower ends 69 and 70 of the electrodes 62 and 63, a nonconductive funnel 73 connects with a dump conduit 74 which may, for example, empty into a barrel or other container (not shown). The nonconductive material of the funnel 73 combined with the fact that the lower end of the cell is always filled during a moisture reading substantially removes any concern for inconsistencies within the lower fringe region at the lower end of the cell 8. The upper nonconductive wall 65 connects with the sample conduit 54. A sample cell dump valve 75 is positioned between the funnel 73 and the dump conduit 74 and is actuated by a dump valve solenoid 76. When the cell 8 is filled for a moisture measurement, the cell 8 is filled well above the inactive region 66 and below the fringe region at the lower end of the cell, whereby no fringe region inconsistencies occur from sample to sample. A sample cell temperature sensor 77, such as a thermistor, is positioned within the cell 8 to measure the temperature of the grain sample for compensation of the measured dielectric constant which is affected by the temperature of the grain samples.

The inner electrode 62 is mounted within the outer electrode 63 by means such as nonconductive vanes 79 which extend therebetween. An electrical conductor 80 which connects the inner electrode 62 to the moisture meter 61 may be routed through one of the vanes 79. The inner electrode 62 is preferably provided with means such as a conical caps 82 at the ends 67 and 69 thereof to prevent the accumulation of grain within the inner electrode. The caps 82 are of a nonconductive material. The nonconductive materials of which portions of the sample cell 8 are constructed may be plastic or any other suitable nonconductive material.

FIG. 3 illustrates the major components of the control system 6 of the grain dryer system 1. The principal control component is a digital computer or central processing (CPU) board 84. The CPU 84 may employ any of a number of suitable microprocessors which are commercially available. The preferred embodiment of the CPU 84 is based on the 6502 microprocessor of MOS Technology, Inc. The CPU 84 executes a program stored in a read only memory (ROM) 85 and stores temporary data in a read/write memory (RAM) 86. A real time clock 87 provides time of day data in relation to the operation of the system 1. A keyboard 88 allows the setting of system operation parameters, while a digital display 89 provides diagnostic information to an operator. Hard copies of system operation information are provided by a printer 90. The operating equipment of the system 1 is interfaced to the CPU 84 by an input-/output (I/O) interface unit or board 92. In general, the I/O unit 92 has the moisture meter 61, the temperature sensors 27 and 28, and other status sensors 93 connected thereto as inputs. The I/O unit outputs commands to the heater unit 4, the various augers, and other equipment of the system 1 as will be detailed hereinbelow.

FIG. 5 illustrates details of the interface unit 92, the sensors monitored by the computer 84, and the equipment controlled thereby. The operating equipment of the system 1 is interfaced to the computer 84 through an interface adapter 96 which is connected to the data bus 97, the address bus 98, and the control bus 99 of the CPU 84. The interface adapter 96 may be any one of a number of commercially available parallel interface adapter devices. The illustrated interface adapter 96 is a 6522 interface device manufactured by MOS Technology, Inc. and which is known as a Versatile Interface Adapter (VIA). The illustrated adapter unit 96 includes sixteen data lines which can be configured through programming, either individually or in groups, as input or output data lines. As employed in the system 1, one eight line group is configured as an input port and has an eight bit input port data bus 102 connected thereto. The remaining eight lines are configured as an output port which has an eight bit output port bus 103 connected thereto. The input bus 102 carries data bytes which originate ultimately from the readings of the temperature sensors 27 and 28, the moisture meter 61, and the status sensors 93. The output bus 103 carries commands and local addresses or selection signals for the proper routing of the commands to the grain dryer system equipment controlled by the computer 84.

The temperature sensors 27, and 28 if used, are preferably thermocouples such as type-J thermocouples, an industry standard name for a type of thermocouple constructed of iron and constantan, which is an alloy of nickel and copper. The thermocouples 27 and 28 are connected by respective relays 106 and 107 to a thermocouple amplifier 108. The amplifier 108 substitutes for the cold junctions normally a part of such thermocouple arrangements and provides calibration in cooperation with an analog to digital converter (ADC) 109 such that a given binary number output from the ADC 109 is interpreted as a corresponding temperature reading. The relays 106 and 107 are activated in alteration under control of the computer 84 so that only one thermocouple at a time is connected to the amplifier 108 for reading thereof. The ADC 109 is connected to the input bus 102 and is an eight bit converter such that 256 temperature levels can be represented by the output therefrom. The conversion process of the ADC occurs periodically and the converter can be read upon receiving a read command from the computer 84.

The moisture meter 61 may be any type of arrangement which is capable of measuring moisture content of the grain in relation to the dielectric constant thereof and which outputs a suitable binary indication of the measured moisture content. Alternatively, the meter 61 may output an analog signal which is converted to a digital signal for the computer 84. Details of the moisture meter 61 employed in the system 1 are not illustrated herein. Reference to portions of the previously mentioned U.S. Pat. No. 3,794,911 will provide more details of the type of moisture meter circuit employed. The illustrated moisture meter 61 is a type which employs a reference oscillator and a variable frequency oscillator having connected in the frequency determining circuit thereof a moisture sensor which, in the system 1, is the sample cell 8. The difference between the frequencies of the two oscillators is counted by a digital counter, and the count is scaled to a moisture content percentage. The meter 61 also preferably employs temperature compensation circuitry including a grain sample temperature sensor, such as the thermistor 77, which adjusts the count in relation to the grain sample temperature.

The moisture meter 61 is activated by a moisture meter control relay 112 which is controlled by the computer 84. A temperature compensation relay 113 activates the temperature compensation circuitry of the meter 61. The binary output reading from the meter 61 is passed through a set of parallel buffers 114 and stored in a set of parallel latches 115 which are connected to the input data bus 102. The latches 115 are enabled as a group to receive the bits of the moisture meter output by a chip select line 116. The moisture meter reading stored in the latches 115 may be read by the computer 84 upon the reception by the latches 115 of a read enable signal on a read enable line 117. The chip select signal and read enable signal are received from the computer 84 over the output port bus 103.

The status switches 93 may function to monitor various conditions which need to be monitored to determine whether the system 1 is operating properly. One specific status sensor is a low grain sensor 120 which is positioned in the grain chamber 18 of the bin 2 to determine if more than a selected amount of grain is present in the chamber. If the sensor 120 indicates a low level of grain in the chamber 18, either the bin loading auger 31 can be activated to load more grain into the bin 2 or the process may be shut down because the current drying run is completed. The other status switches 93 may include, for example, a switch to determine whether or not the sample valve 55 has opened or closed when commanded by the computer 84 to do so. Other such status switches would occur to one skilled in the relevant art. The switch states which are provided by the status switches 93 and low grain sensor 120 are temporarily stored in a set of parallel latches 121 which are similar to the latches 115. The latches 121 are read from the input port bus 102 upon the reception of a read enable signal on a read enable line 122 which is connected to one of the lines of the output port bus 103. The latches 121 are enabled to record changes in state of the status switches 93 and 120 upon receiving a chip select signal on a chip select line 123.

Figure 6:
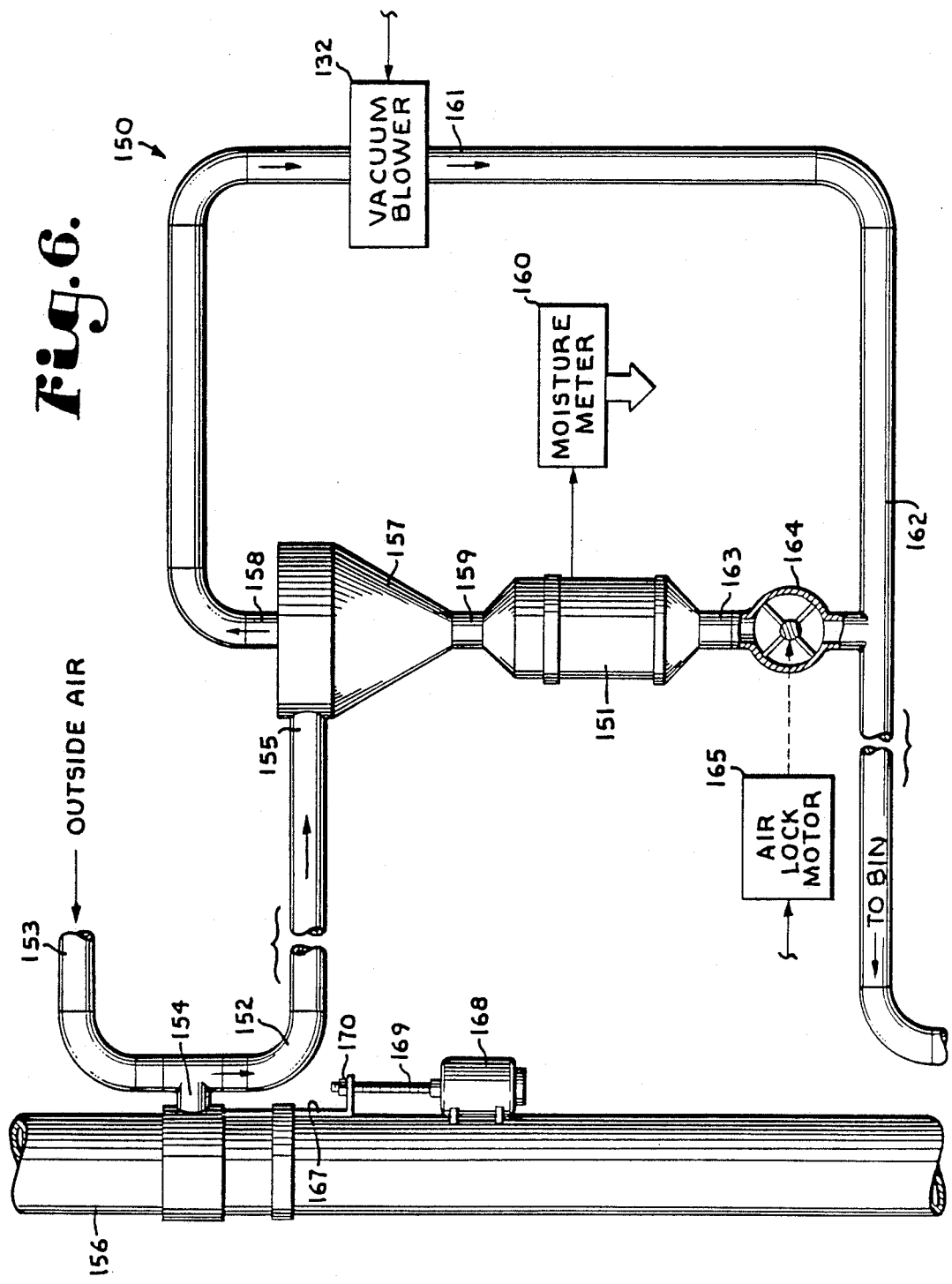
FIG. 6 is a diagramatic side elevational view of a vacuum blower arrangement for automatically loading grain into the sample cell of the present invention.

The functions of the system 1 which are controlled by the computer 84 include: the blower 22, the high fire valve 23, the low fire valve 24, the bin unloading auger motor 38, the sample valve motor 56, and the sample cell dump valve solenoid 76. The sample cell load valve motor 56 includes an open sample valve winding 125 and a reverse close sample valve winding 126. Each of these functions is controlled through the interface adapter 96 by way of the output bus 103, addressing circuitry which will be detailed below, and respective triacs 128. Further functions which are controlled by the computer 84 include various indicator lights 129 which are located on a console (not shown) of the computer system 6 and a sounder or buzzer 130. The indicator lights 129, only one of which is diagrammatically illustrated for simplicity, may correspond to any of the operating equipment and advise an operator of the activation of such equipment. The buzzer 130 alerts the operator to certain sensed conditions within the system 1, such as shutdown of the system 1 due to equipment malfunction. FIG. 5 shows the connection of a vacuum blower 132 which is employed in a modified embodiment of the grain sample system as is shown in FIG. 6. Additional unused control lines 133 provide for additional controlled functions as may be required in some embodiments of the system 1.

The manner of addressing the functions monitored and controlled by the I/O board 92 is substantially conventional. The interface adapter 96 is addressed by the computer 84 by an address decoder 135 of conventional design which is connected to the address bus 98 of the computer 84. Certain lines of the output port bus 103 are dedicated to local address codes, direct enable lines, and data lines. With eight bits available, 256 unique binary combinations can be outputted by the port connected to the bus 103. The addressing logic circuitry of the I/O board 92 is configured to correctly route the codes outputted by the interface adapter 96. The latches groups 115 and 121 and the ADC 109 are controlled by a decoder 137 which is a 4-to-16 line decoder. The four inputs of the decoder 137 are connected to four of the lines of the bus 103, and a chip enable terminal of the decoder 137 is connected to a direct enable line 138 of the bus 103. Two of the outputs of the decoder 137 are the chip enable lines 116 and 123 of the latch groups 115 and 121. Another output line of the decoder 137 is an ADC read enable line 139 which when activated causes the output of the ADC 109 to be placed on the input port bus 102 for reading by the computer 84. The remaining output lines of the decoder 137 are presently unused.

The functions controlled by the computer 84 are locally addressed by a pair of 3-to-8 line decoder latches or addressable octal latches 142 and 143. Each of the latches 142 and 143 is connected to three lines of the output bus 103 for addressing purposes and a single line for receiving data in the form of an ON or OFF command. Two additional lines of the bus 103 are decoded by decoder select logic circuits 144 and 145 respectively for the latches 142 and 143. Finally, a single line of the bus 103 is used to carry a reset command for the latches 142 and 143. The output lines of the latch 142 are connected to the relays 106, 107, 112, and 113 and through the triacs 128 to the auger motor 38 and the vacuum blower 132 if present. The output lines of the latch 142 are connected through triacs to the blower 22, the burner valves 23 and 24, the sample valve motor 56, the dump solenoid 76, and the lights and buzzer 129 and 130.

FIG. 6 illustrates a modified grain sampling arrangement 150 which employs the vacuum blower 132 to urge grain into a sample cell 151 to determine the moisture content thereof. A grain sample conduit 152 has an airflow inlet 153, a grain inlet 154, and an outlet 155. The inlet 153 receives air preferably from a source outside of the grain drying bin to avoid the introduction of excess moisture from the drying bin. The grain inlet 154 communicates with the tube 156 of a center vertical unloading auger similar to the auger 33 of the bin 2. The airflow in the conduit 152 causes the induction of grain from the tube 156 such that the grain is entrained in the airflow. The outlet 155 of the conduit 152 is connected to an inlet of a separator 157 which is preferably a cyclone separator. The separator 157 has an airflow outlet 158 and a grain outlet 159. The airflow outlet 158 is connected to the vacuum blower 132 while the grain outlet 159 is connected to the sample chamber 151 which is substantially similar to the sample chamber 8. The separator 157 is of conventional design and is constructed internally to arrest the movement of the grain such that it may fall by gravity toward the outlet 159 and into the cell 151, while the airflow exits through the outlet 158. The sample cell 151 is connected to a digital moisture meter 160 similar to the moisture meter 61.

The vacuum blower 132 has an outlet 161 which communicates with a grain return conduit 162 such that the grain sample can be returned to the bin from which it was taken. The sample cell 151 has an outlet 163 which connects with the return conduit 162 through an airlock mechanism 164 which is driven by an airlock motor 165. The airlock 164 is a rotary mechanism which empties the sample cell 151 and prevents the introduction of pressurized air from the return conduit 162 into the cell 151 which would otherwise interfere with the emptying thereof. A sample valve gate 167 is positioned between the grain inlet 154 of the sample conduit 152 and an opening (not shown) in the auger tube 156. The sample valve 167 may be similar to the sample valve 55 of the sample system 5 and operates in a similar manner. A reversible rotary motor 168 has a threaded shaft 169 which engages a nut 170 affixed to the valve 167. The motor 168 may be connected to the I/O board 92 in place of the motor 56 and operated in a similar manner.

In operation of the vacuum grain sample arrangement 150, the vacuum blower 132 is activated to draw grain into the sample cell 151 through the separator 157 and then deactivated. There, the moisture content of the sample is measured by the moisture meter 160. After the measurement is made, the airlock motor 165 is activated and the vacuum blower 132 reactivated to empty the sample cell 151 and return the grain to the bin from which it was taken. The sample valve 167 is only open during the loading of the sample cell 151. The majority of the components of the sample arrangement 150 are positioned outside of the bin 2 from which the samples are taken and are suitably enclosed to protect them from the elements.

In general operation of the system 1, an operator turns on the computer 6 and sets the desired grain moisture content, the maximum plenum temperature, a blower start-up temperature for the plenum 17, and the current time. The system 1 is then controlled by the computer 6 to take an initial moisture reading by activating the unloading augers 3 and the sample valve 55 or 167 to cause the loading of the sample cell 8 or 151. While this is occurring, the burner is ignited, and the control system 6 is set to automatic operation. If the sample is wetter than desired, a waiting period is initiated in proportion to the difference between the measured moisture content and the desired moisture content. The heating unit 4 is cycled in such a manner as to dry the grain 7 most efficiently. If the initial cycle is as dry as or dryer than desired, the unloading augers 3 are activated to unload grain from the bin 2 and transfer it to as storage bin 10. In the automatic mode of operation, moisture readings are taken at selected intervals of time, and the heater unit 4 and augers 3 are automatically controlled in response to the moisture content and sensed temperatures. The system 1 will shut itself down upon the occurrence of predefined malfunctions and display diagnostic messages or print out such messages. When the grain level sensor 120 senses that the bin 2 is empty, the system 1 will shut itself down and print a report of the operation.

In a preferred mode of operation, an initial moisture content reading is taken. If the reading is wetter than the desired moisture content, a wait period is initiated during which the heater unit 4 is cycled to maintain the start-up temperature. After the initial moisture content measurement, the subsequent moisture readings are averaged up to a selected maximum, for example, four readings including the current reading. After the first reading, as each reading is taken and determined to be wetter than desired, the controller 6 cycles the heater unit 4 to maintain an incrementally higher drying air temperature. As soon as either the current reading or the average moisture content is reduced to the desired moisture content, the unloading augers 3 are activated to remove grain from the bin 2.

Thereafter, the drying air temperature is adjusted, by cycling the heater unit 4 through the high and low fire valves 23 and 24, to accommodate variations in the moisture content of grain incoming into the bin 2. The controller 6, therefore, discerns a trend in the moisture content of the grain and adjusts the maintained drying air temperature in accordance with short term variations in the moisture content as measured. For example, if the average moisture content is as dry as desired, but the currently measured moisture content is too wet, the maintained drying air temperature is increased. Conversely, if either the average or current moisture content drops below the desired moisture percentage, the maintained air temperature is reduced to prevent overdrying. Before each increase in air temperature, the currently maintained drying air temperature is compared to the set maximum temperature to prevent "cooking" of the grain from excessive heat. The object is to adjust the drying air temperature in such a manner as to uniformly dry the grain while operating the unloading augers 3 as continuously as possible. This allows the drying process to proceed as rapidly as is possible commensurate with high uniformity of moisture content. The control method as described herein when operated with the apparatus described above retains the energy efficiency associated with batch dryers while operating at a greater throughput than can usually be achieved in such batch dryers.

Figure 7:
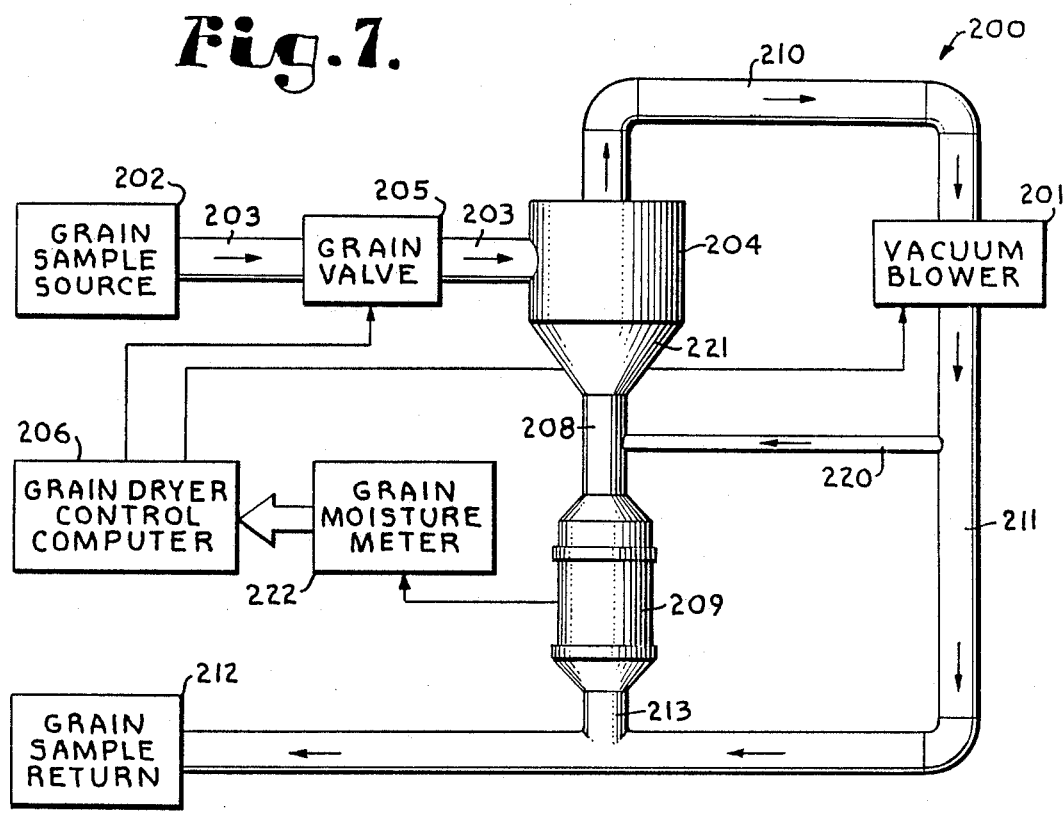
FIG. 7 is a view similar to FIG. 6 at a reduced scale and illustrates a modified embodiment of a pneumatic grain sampling apparatus.

Referring to FIG. 7, a second modified embodiment of a vacuum grain sample withdrawal apparatus 200 is illustrated. In most respects, the sampling apparatus 200 is similar to the sampling apparatus 150 of FIG. 6. The apparatus 200 includes a vacuum blower 201 which creates a grain withdrawal airflow which draws grain from a grain sample source 202, which may be an auger tube, a grain bin, a grain column, or the like, into a grain sample conduit 203. The grain sample conduit 203 extends between the grain source 202 and a cyclone separator 204 similar to the separator 157 of FIG. 6. A grain valve 205 is positioned in the conduit 203 to control flow therethrough. The operation of the grain valve 205 and the vacuum blower 201 is controlled by the grain dryer control computer 206 which is similar to the computer 84 of the grain dryer system 1.

The separator 204 is caused to accumulate, during the operation of the vacuum blower 201, a grain sample by the action of a sample cell valve mechanism 207 (FIG. 8) positioned in a sample cell inlet conduit 208. The valve mechanism 207 controls the deposit of a grain sample into a capacitive grain moisture sample cell 209 similar to the sample cell 8 of the system 1. An air outlet conduit 210 extends between the separator 204 and the vcuum blower 201. A positively pressurized return conduit 211 extends between the vacuum blower 201 and a grain sample return 212. The return conduit 211 also connects with a grain outlet end 213 of the sample cell 209. The grain sample return 212 may be a grain bin, a grain unloading auger, a barrel to collect grain samples, or may be identical with the grain sample source 202.

Figure 8:
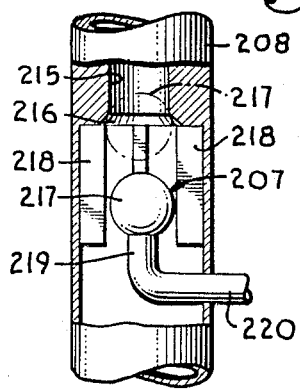
FIG. 8 is an enlarged elevational view of a sample cell valve of the grain sampling apparatus of FIG. 7 with a portion broken away to illustrate details.

Referring to FIG. 8, the sample cell valve mechanism 207 is a pneumatically operated ball valve. The sample cell inlet conduit 208 has a throat 215 therein which has a valve seat 216 formed at the lower end. A spherical valve member or ball 217 is slidably mounted within the conduit 208 by a plurality of radial vanes 218 which allow grain flow therebetween when the ball 217 is unseated. The lower position of the ball 217 is determined by the upturned end 219 of a valve operating conduit 220 extending between the return conduit 211 and the sample cell inlet conduit 208.

When the vacuum blower 201 is activated to withdraw a grain sample from the grain sample source 202 and the grain valve 205 is opened, a positive airflow is created in the valve operating conduit 220 which lifts the ball 217 to its upper position in contact with the valve seat 216 in addition to entraining grain into the withdrawal airflow. This closes the throat 215 such that the grain which is separated from the grain withdrawal airflow in the separator 204 accumulates in a lower hopper section 221 of the separator. The operation of the blower 201 is timed by the computer 206 to accumulate a sufficient grain sample to overfill the sample cell 209. When the blower 201 is deactivated, the accumulated grain sample flows under the influence of gravity into the sample cell 209 for measurement of the moisture content thereof by a grain moisture meter 222 similar to the grain moisture meter 61 of the system 1. The grain sample extends above and below the active region of the sample cell 209 to avoid electric field fringing effects at the ends of the active region.

After the grain moisture content has been measured, the grain valve 205 is closed, and the vacuum blower 201 is again activated. The airflow from the valve operating conduit 220, after urging the ball 217 into contact with the valve seat 216, pressurizes the upper end of the sample cell 209 which causes the sample cell 209 to be emptied in cooperation with the grain return airflow created in the return conduit 211. One advantage of the grain sample withdrawal apparatus 200 over the apparatus 150 of FIG. 6 is that more uniform packing of grain within the sample cell 209 is achieved in the apparatus 200 because of the manner of loading the sample cell. This results in more accurate grain moisture content measurements.

Figure 9:
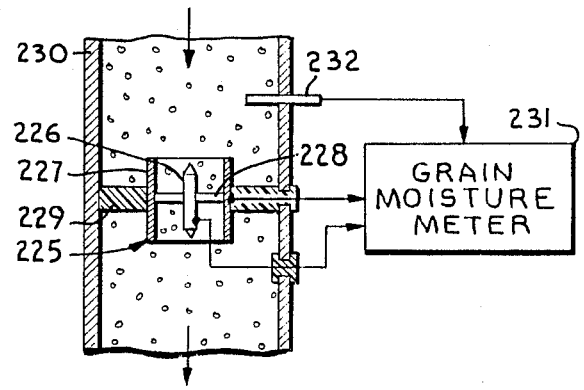
FIG. 9 is a diagrammatic cross-sectional view of a flow-through embodiment of the grain moisture meter sample cell.

FIG. 9 diagrammatically illustrates an alternative grain sample cell 225 operating on capacitive principles. The sample cell 225 is a flow-through cell and includes a conductive inner cylindrical electrode 226 supported within a conductive outer cylindrical electrode 227 by nonconductive radial bars 228. The cell 225 is supported by radial vanes 229 within a tubular grain structure 229 which may be a grain column, a grain transfer tube associated with a grain auger, or the like. The electrodes 226 and 227 are connected to a grain moisture meter 231 which measures the dielectric constant of grain positioned between the electrodes 226 and 227. A grain temperature probe 232 is positioned within the grain structure 230 for temperature compensation purposes. The grain moisture meter 231 is substantially similar to the meter 61 of the system 1. The bars 228 and the vanes 229 are formed of nonconductive materials which are resistant to abrasive damage by the flowing grain. Since the moisture content of a quantity of grain usually does not vary greatly over a short distance, there is insignificant error in measuring the moisture content while the grain is in motion. While the capacitive sample cell 225 is described and illustrated as being cylindrical, it is known that other geometric shapes are suitable for the electrodes or plates thereof. Specifically, planar plates and finger shaped electrodes are also contemplated.

Figure 10:
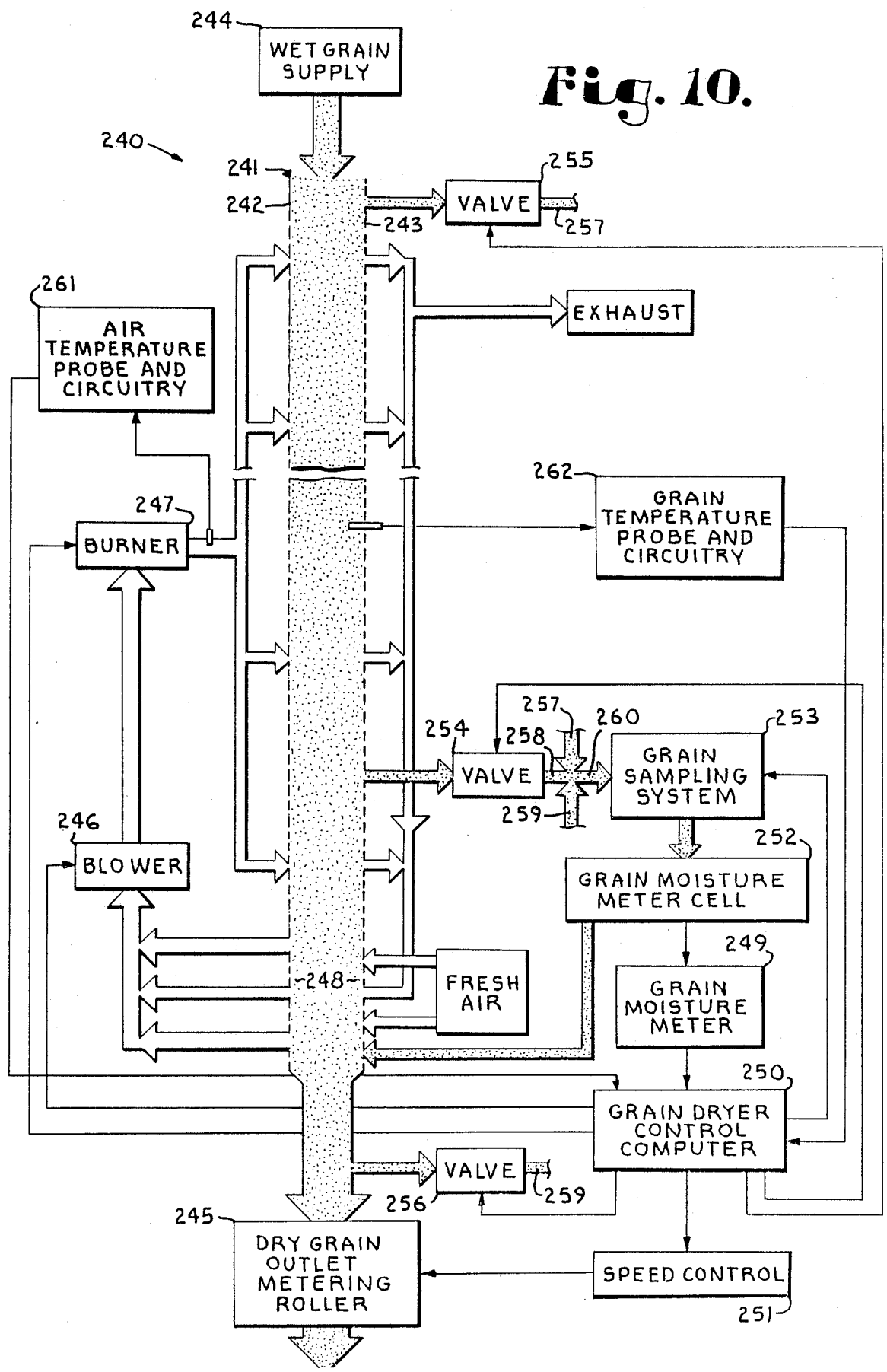
FIG. 10 is a diagrammatic representation of a continuous crossflow grain dryer system according to the present invention.

FIG. 10 diagrammatically illustrates a continuous crossflow grain dryer 240 according to the present invention. The dryer 240 generally includes a grain column 241 formed by perforated inner and outer walls 242 and 243 respectively, a continuous wet grain supply 224 which may be a grain conveyor or auger, a continuous dry grain outlet metering roller 245 whose speed is controllable, an air blower 246, and an air heater or burner 247. Grain columns are typically constructed with an inner hot air plenum (not shown) formed by the inner wall 242 and include a further wall beyond the outer wall 243 which controls the recycling of air. As such, grain columns are usually at least two sided and rectangular in horizontal cross-section, some being four sided and square, and still others being cylindrical. FIG. 10 illustrates substantially a vertical half cross-section of such a structure for simplicity.

Outside ambient air (fresh air) is drawn by the blower 246 through a lower cooling section 248 of the grain column and propelled through the burner 247 to be heated and then across and through the grain moving through the grain column 241 through the perforated walls 242 and 243. A portion of the moisture laden air exiting from the column 241 is routed back to the blower 246, being mixed with fresh air, while the remaining air is exhausted into the atmosphere. The recycling of a portion of the air increases energy efficiency and additionally reduces to some extent the output of grain particulates. The temperature of the air heated by the burner 247 is made as high as possible without damaging the grain to speed the drying process and thus conserve energy. Rice and germinating seed grains are particularly susceptible to damage from excessive heat; therefore, lower temperatures are required for drying these grains. The flow rate of the grain down the grain column 241 is controlled by controlling the speed of the metering roller 245 which removes grain from the column. As the grain moves down the column 241, the moisture in the kernals surfaces and is evaporated by the heated airflow. In the lower section 248, the grain is cooled by the flow of incoming fresh air.

In the grain dryer 240, the drying process is controlled principally in relation to the grain moisture content as measured by a grain moisture meter 249. The meter 249 generates a grain moisture signal which is read by a grain dryer control computer 250 which, in turn, controls the speed of the metering roller 245 through speed control circuitry 251 which may include digital-to-analog conversion circuitry in combination with conventional voltage based motor control circuitry (not shown). The grain moisture meter 249 measures the dielectric constant of a grain sample deposited in a grain moisture meter cell 252 by a grain sampling system 253 which may be similar to the grain samplers 150 or 200 described above.

The sampling system 253 includes a grain valve 254 which controls the flow of grain therethrough. A preferred location for withdrawing grain from the grain column 241 is approximately one third of the way up from a lower end of the column 241. Other possible locations for grain withdrawal include the upper end of the grain column or the lower end. The system includes multiple grain withdrawal locations which are selected by the control computer 250. The upper location includes an upper grain valve 255 and the lower location a lower grain valve 256. The upper, middle, and lower grain valves 255, 254, and 256 each includes a respective grain valve outlet conduit 257, 258, and 259 which merge at an inlet conduit 260 of the grain sampling system 253. By closing all the grain valves except one, the computer 250 thereby control the source of the grain sample. Alternatively, the dryer 240 may employ one or more flow-through sample cells, as illustrated in FIG. 9, which are positioned within the grain column 241 instead of the external sampling system 253.

The control computer 250 is capable of controlling the operation of the blower 246 and burner 247, although it is not necessary for successful operation of the dryer 240. In order to provide inputs for such control, the illustrated dryer 240 includes an air temperature probe and circuitry 261 positioned to sense the temperature of air after being heated and a grain temperature probe and circuitry 262. The grain temperature probe is especially desirable if the dryer 240 is to be used to dry granular materials which are susceptable to damage from excessive heat. The air temperature probe 261 is used principally in connection with maintaining a selected air temperature by cycling the burner 247 or adjusting fuel flow thereto.

In operation of the continuous crossflow grain dryer 240, an operator enters a desired grain moisture content into the compute 250 and, if necessary, a maximum permissible grain temperature. The wet grain supply 244 is activated to fill the grain column 241 with grain, and the blower 246 and burner 247 are activated to provide drying air. Soon after the grain column 241 is filled, a grain sample is drawn by the sampling system 252 to measure the grain moisture content by the grain moisture meter 249. Thereafter, grain samples are withdrawn and the grain moisture content of the samples is measured. Based on the grain moisture measured, the metering roller 245 is either speeded up or slowed down to achieve the desired grain moisture content as the grain leaves the grain column 241. Adjustments to the metering roller speed may also be made in relation to the grain temperature measured by the grain temperature probe 262. Additionally, the maintained air temperature may be stepped up or down based on the initial grain moisture content to achieve the best energy efficiency consistent with the desired output grain quality. The metering roller speed is preferably controlled in relation to an average of recent grain moisture content readings, as in the system 1, to stabilize the process response to fluctuations in initial grain moisture content.

The grain dryer control computer 250 is similar to the computer 84 of the system 1 and may include similar output devices such as a printer (not shown) to print a record of the process. A printed record of the process can be especially useful to an operator in making the best use of the grain dryer 240 with regard to energy efficiency and grain throughout.

Figure 11:
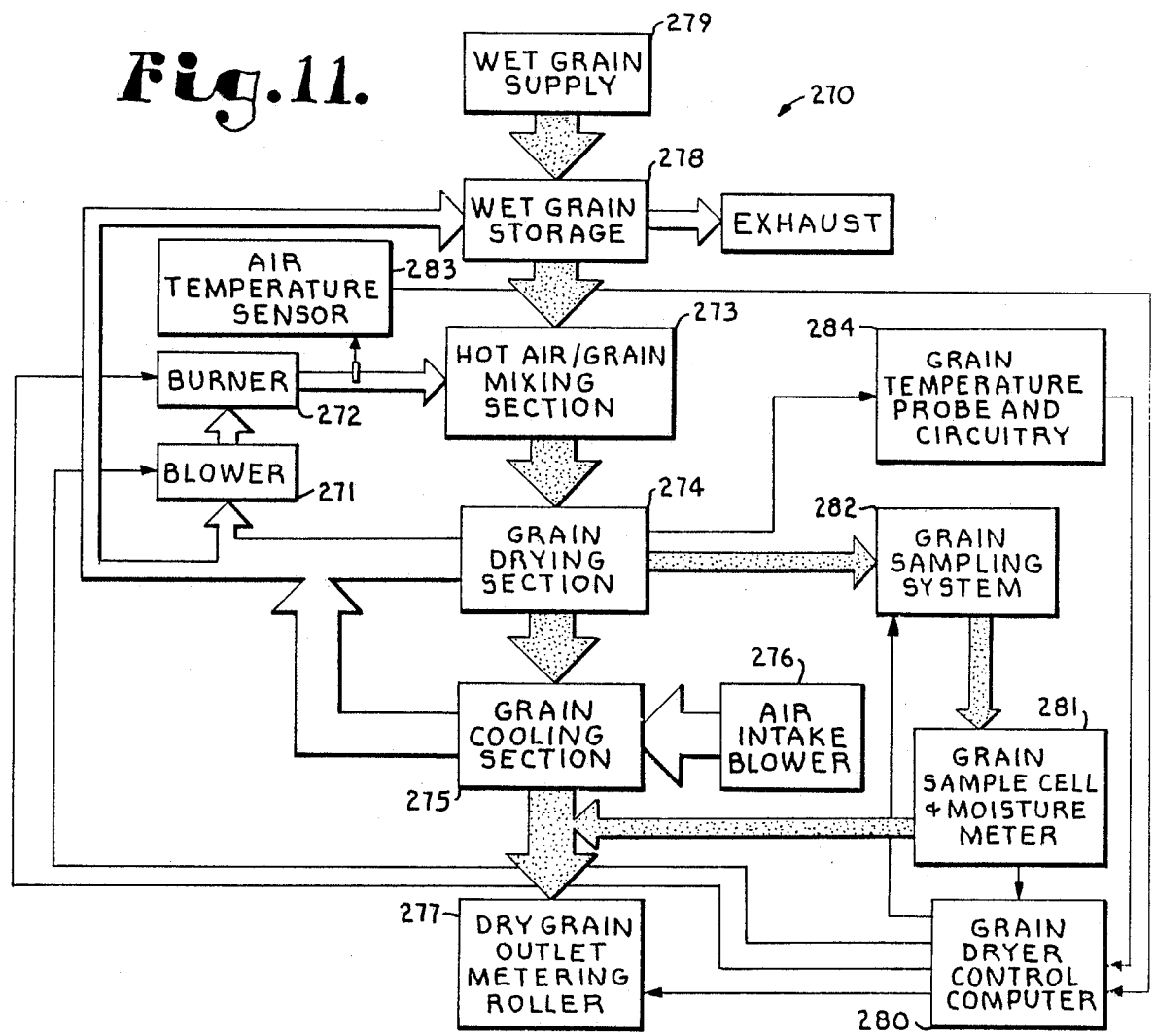
FIG. 11 is a block diagram illustrating the principal operational and control components of a continuous concurrent flow grain dryer according to the prevent invention.

FIG. 11 diagrammatically illustrates a continuous concurrent flow grain dryer 270. In a concurrent flow dryer, the drying air and grain move in the same direction, usually downwardly. Hot air supplied by a blower 271 and heated through a burner 272 is mixed with wet grain falling through a mixing section 273. The temperature of the heated air is very high, often in the range of 500 to 600 degrees Fahrenheit. From the mixing section 273, the heated grain and air pass to a drying section 274 in which the moisture within the kernals of the grain surfaces and is evaporated. From the drying section, the moisture laden air is drawn off by the blower 271 as the grain enters a cooling section 275 in which the grain is cooled by fresh air drawn therethrough by the blower 271 or blown therethrough by an intake blower 276.

The drying and cooling sections 274 and 275 form a continuous grain column through which grain flow rate is controlled by a dry grain metering roller 277 similar to the roller 245 of the crossflow dryer 240. Thus, the drying process is controlled in a substantially similar manner by controlling the time in residence of the grain within the drying section 274 by controlling the speed of the metering roller 277.

The moisture laden air from the drying section 274 and the air received from the cooling section 275 are mixed and cycled by the blower 271 to the burner 272. A portion of this air is directed to a wet grain storage section 278 of the dryer 270 for preheating the grain to lessen damage possible from thermal shock as the relatively cool wet grain is subjected to the elevated heat in the mixing section. From the wet grain storage section 278, the air is exhausted to the atmosphere. The wet grain storage section 278 is fed by a wet grain supply 279 which may be a grain conveyor or a grain auger.

The speed of metering roller 277 and, thus, the length of time that the grain is present in the drying section 274 is controlled by a grain dryer control computer 280 in relation to the grain moisture content measured by a grain moisture meter 281 including a capacitive grain sample cell. The grain samples are illustrated as being withdrawn from the grain drying section 274, by a grain sampling system 282 similar to the sampling systems 150 and 200, described above, under the control of the computer 280. It is also desirable and in some cases preferable to measure the grain moisture content at the end of the drying process as by withdrawing a grain sample from the grain cooling section 275 or from the metering foller 277. The computer 280 may also receive inputs from an air temperature sensor 283 which measures the temperature of the heated air and a grain temperature sensor 284 which measures the temperature of the grain in the drying section 274. In general, the manner of controlling the process in the concurrent flow dryer 270 may be substantially similar to the manner of controlling the continuous crossflow dryer 240.

Figure 12:
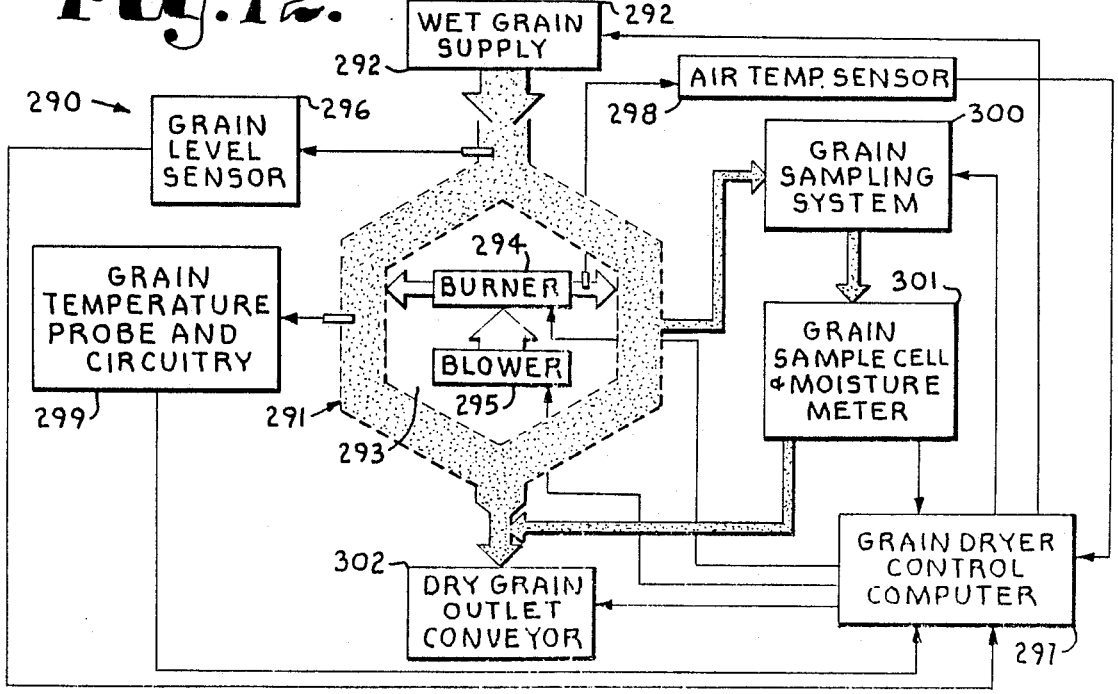
FIG. 12 is a diagrammatic representation of a crossflow batch grain dryer according to the present invention.

FIG. 12 diagrammatically illustrates a crossflow batch dryer 290 according to the present invention. The principal difference in concept between a continuous crossflow dryer such as the dryer 240 and the crossflow batch dryer 290 is that since a quantity of grain resides stationarily in the batch dryer 290 through the drying process, the main control parameter in the batch dryer 290 is the time of residence rather than the rate of flow as in the continuous dryer 240.

The batch dryer 290 includes a perforated grain container or chamber structure 291 which receives wet grain from a wet grain supply 292 which may be a grain conveyor or a grain auger. The illustrated grain container structure 291 forms an internal hot air plenum 293 from which air heated by a burner 294 is forced by a blower 295 through the grain within the grain container structure 291. The container structure 291 must be kept full during the drying process to prevent heated air from escaping without drying any grain. As most grains dry, shrinkage occurs. Therefore, a grain level sensor 296 is positioned in a passage leading into the container structure 291. The sensor 296 is read by a grain dryer control computer 297 which causes the wet grain supply 292 to load more grain when shrinkage occurs. An air temperature sensor 298 provides inputs to the computer 297 for control of the burner 294 to maintain the desired temperature. A grain temperature sensor 299 may also be provided particularly if the dryer 290 is to be used to dry grains sensitive to high temperatures.

A grain sampling system 300 is controlled by the computer 297 to withdraw grain samples for deposit in a grain sample cell and grain moisture meter 301 to measure the grain moisture content thereof. According to the difference between the desired grain moisture content entered into the computer 297 and the actual grain moisture content measured by the meter 301, the computer 297 calculates a remaining drying time and keeps track of passing time with an internal clock. At the end of the calculated period, the computer 297 controls a dry grain outlet conveyor 302 to remove grain from the grain container structure 291. The computer 297 also controls the burner 294 to maintain a selected air temperature or to step up or down depending on the measured grain moisture content, the initially set air temperature, and any restrictions on the air temperature.

The dryer 290 is illustrated as withdrawing grain samples from a middle level of the grain container structure 291. However, grain samples could also be withdrawn from an inlet end or an outlet end of the structure 291, in much the same manner as described and illustrated in FIG. 10. By measuring the grain moisture content at a plurality of points along the process including the end, it is possible to periodically recalculate and update the remaining drying time. The dryer 290 could also employ one or more flow-through grain sample cells such as the cell 225 illustrated in FIG. 9. In other respects, the batch dryer 290 may be operated in a manner similar to that described in connection with the other dryers of the present invention, particularly with regard to control of the drying process in relation to the average of a plurality of successive grain moisture content readings.

The grain drying systems 1, 240, 270 and 290 provide significant advantages over previously employed grain dryer systems. The drying operations are controlled in relation to directly measured grain moisture content rather than moisture content related to temperature measurements of air and grain which is subjected to a greater number of variables. Start up with the system of the present invention is faster for the operator since it is not necessary to wait for equilibrium conditions to be established as in systems in which control is based on temperature derived moisture content. The systems continuously adjust the drying temperature for maximum drying rate and monitor the operation to prevent overdrying of the grain. Since the moisture content measurements are made periodically, variations in moisture of the grain during processing can be compensated for as they are sensed such that greater uniformity of moisture content results. The monitoring and display of the status of the grain drying equipment speeds troubleshooting when malfunctions occur. The printing of records of the drying operations over a drying season facilitates planning and scheduling for the next season. Because the operation is closely monitored and controlled in response to monitored conditions, greater throughput and efficiency can be attained. Finally, the systems do not require a high degree of skill to operate and can run for the most part without human intervention.

It is foreseen that other types of non-manual grain moisture measuring devices such as grain moisture measurement probes and grain moisture measurement instruments based on infrared principles could be advantageously employed. The grain dryer systems of the present invention have been described and illustrated as including a grain "chamber or container". Such terminology is not meant to imply that the grain must be fully enclosed during drying. It would be possible to construct an open ended grain container which could be successfully operated according to the present invention. Finally, the dryers of the present invention have been described and illustrated as employing heated air in the drying process. While this is usually desirable from a processing speed standpoint, it is by no means essential. Grain dryers which cycle unheated ambient air have been operated successfully in the past and could be operated more beneficially by applying the control methods and apparatus of the present invention.

It is to be understood that while certain forms of the present invention have been illustrated and described herein, it is not to be limited to the specific forms or arrangement of parts described and shown.

What is claimed and desired to be secured by Letters Patent is as follows:

1. A method of drying grain comprising the steps of:
   (a) providing a grain drying apparatus including grain dryer chamber means to hold grain, grain conveyor means to urge grain into and out of said chamber means, a heater unit to communicate heated air to said chamber means to dry said grain, grain moisture meter means to measure the moisture content of grain, and dryer control means having said grain conveyor means, said heater unit, and said grain moisture meter means interconnected thereto;
   (b) conveying grain into said chamber means;
   (c) communicating heated air from said heater unit to said chamber means to dry said grain;
   (d) periodically measuring the dielectric constant of said grain from a drying zone near where said heated air first communicates with said grain such that the moisture content of the grain from near the inlet of the heated air is measured and converting the measured dielectric constant to a grain moisture content of said grain by means of said grain moisture meter means;
   (e) generating a grain moisture signal representative of the moisture content of said grain by said grain moisture meter means;
   (f) communicating said grain moisture signal to said control means; and
   (g) controlling the operation of said heater unit by said dryer control means in response to the grain moisture content represented by said grain moisture signal.

2. A method of drying grain comprising the steps of:
   (a) providing a grain drying apparatus including grain dryer chamber means for holding grain, grain conveyor means to urge grain into and out of said chamber means, a heater unit to communicate heated air to said chamber means to dry said grain, grain moisture meter means for measuring the moisture content of said grain, and dryer control means having said grain conveyor means and said moisture meter means interconnected thereto;
   (b) conveying grain into said chamber means;
   (c) communicating heated air from said heater unit to said chamber means to dry said grain;
   (d) periodically measuring the dielectric constant of said grain taken from a drying zone near where said heated air first communicates with said grain such that the moisture content of the grain from near the inlet of the heated air is measured and converting the measured dielectric constant to a grain moisture content of said grain by said grain moisture meter means;

(e) generating a grain moisture signal representative of the moisture content of said grain by said grain moisture meter means;

(f) communicating said grain moisture signal to said control means; and (g) controlling the operation of said grain conveyor means by said dryer control means in response to the moisture content represented by said grain moisture signal to withdraw grain from said drying zone in response to said grain moisture content being near a preselected level.

3. A method of drying granular material including grain in a grain dryer apparatus including grain chamber means to contain grain, grain conveyor means to move grain into and out of said chamber means, a dryer air unit to communicate air to said chamber means to dry grain therein, grain moisture means to measure the moisture content of grain, and grain dryer control means having said grain conveyor means and said grain moisture meter means interconnected thereto; said method comprising the steps of:

(a) loading grain into a grain chamber means by means of grain conveyor means;

(b) communicating air from a dryer air unit to said chamber means to dry said grain;

(c) periodically measuring the dielectric constant of said grain by means of a grain moisture meter means and converting the measured dielectric constant to a grain moisture content of said grain;

(d) generating a grain moisture signal representative of the grain moisture content of said grain by means of said grain moisture meter means;

(e) communicating said grain moisture signal to a grain dryer control means having said grain conveyor means, said dryer air unit, and said grain moisture meter means interconnected thereto; and (f) controlling by said grain dryer control means the drying of said grain in said grain chamber means in relation to the moisture content represented by said grain moisture signal.

4. A method as set forth in claim 3 wherein said dryer air unit includes air heater means and including the step of:

(a) heating said air by air heater means prior to communication of said air to said grain chamber means.

5. A method as set forth in claim 4 wherein said air heater means is interconnected with said grain dryer control means and wherein the step of controlling the drying of said grain includes the step of:

(a) controlling said air heater means by said grain dryer control means in such a manner as to control the temperature of air heated by said air heater means.

6. A method as set forth in claim 4 including the step of:

(a) sensing the temperature of grain in said grain chamber means.

7. A method as set forth in claim 3 wherein the step of controlling the drying of said grain includes the step of:

(a) controlling the length of time that grain within said grain chamber means receives air from said dryer air unit.

8. A method as set forth in claim 7 including the step of:

(a) removing grain from said grain chamber means by said grain conveyor means upon measuring a selected grain moisture content within said grain.

9. A method as set forth in claim 7 including the steps of:

(a) continuously moving grain through said grain chamber means by said grain conveyor means; and (b) controlling the speed of said grain conveyor means in relation to the measured grain moisture content.

10. A method as set forth in claim 3 including the steps of:

(a) mechanically withdrawing a grain sample of grain from said grain chamber means;

(b) measuring the grain moisture content of said grain sample; and (c) generating said grain moisture signal which represents the grain moisture content of said grain sample.

11. A method as set forth in claim 3 including the step of:

(a) measuring the grain moisture content of grain which has been contacted by drying air from said dryer air unit.

12. A method as set forth in claim 3 wherein said dryer air unit includes air heater means interconnected with said dryer control means and including the step of:

(a) heating said air by air heater means prior to communication of said air to said grain chamber means;

(b) sensing the temperature of air heated by said air heater means;

(c) entering a desired drying air temperature into said control means; and (d) controlling the operation of said air heater means by said dryer control means to normally maintain said desired drying air temperature.

13. A method as set forth in claim 12 including the steps of:

(a) entering a desired grain moisture content into said grain dryer control means; and (b) upon said grain moisture signal respresenting a grain moisture content which is not greater than said desired grain moisture content, controlling said grain conveyor means by said grain dryer control means to unload grain from said grain chamber means.

14. A method as set forth in claim 12 including the steps of:

(a) entering a desired grain moisture content into said grain dryer control means;

(b) continuously moving grain through said grain chamber means by said grain conveyor means; and (c) upon said grain moisture signal representing a grain moisture content which is not greater than said desired grain moisture content, controlling said grain conveyor means by said grain dryer control means to increase the rate of movement of grain through said grain chamber means.

15. A method as set forth in claim 3 including the steps of:

(a) continuously moving grain through said grain chamber means by said grain conveyor means;

(b) measuring a final dielectric constant of said grain as said grain is exiting said grain chamber means and converting said final dielectric constant to a final grain moisture content of the exiting grain;

(c) calculating a grain flow rate to achieve a desired grain moisture content based upon said final grain moisture content of said exiting grain; and
(d) controlling the speed of said grain conveyor means to achieve the calculated grain flow rate.

16. A method as set forth in claim 3 including the steps of:
   (a) continuously moving grain through said grain chamber means by said grain conveyor means;
   (b) measuring an initial dielectric constant of said grain from a position near an entrance of said grain chamber means and converting said initial dielectric constant to an initial grain moisture content of said grain;
   (c) measuring a final dielectric constant of said grain as said grain is exiting said grain chamber means and converting said final dielectric constant to a final grain moisture content of said grain;
   (d) calculating a grain flow rate to achieve a desired grain moisture content based on the relationship between said initial grain moisture content and said final moisture content; and
   (e) controlling the speed of said grain conveyor means to achieve the calculated grain flow rate.

17. A method as set forth in claim 3 including the steps of:
   (a) continuously moving grain through said grain chamber means by said grain conveyor means;
   (b) measuring an intermediate dielectric constant of said grain as said grain is flowing through said grain chamber means and converting said intermediate dielectric constant to an intermediate grain moisture content of said grain;
   (c) measuring a final dielectric constant of said grain as said grain is exiting said grain chamber means and converting said final dielectric constant to a final grain moisture content of said grain;
   (d) calculating a grain flow rate to achieve a desired grain moisture content based on the relationship between said intermediate grain moisture content and said final moisture content; and
   (e) controlling the speed of said grain conveyor means to achieve the calculated grain flow rate.

18. A method of continuously drying granular material including grain in a grain dryer apparatus including grain chamber means through which grain is moved to be dried, grain conveyor means to urge grain through said chamber means, an air heater unit to communicate heated air to said chamber means to dry grain therein, grain moisture meter means to measure the moisture content of of grain, and grain dryer control means having said grain conveyor means and said grain moisture meter means interconnected thereto; said method comprising the steps of:
   (a) continuously moving grain through a grain chamber means by means of grain conveyor means;
   (b) communicating air from an air heater unit to said chamber means to dry said grain;
   (c) periodically measuring the dielectric constant of said grain and converting the measured dielectric constant to a grain moisture content of said grain by means of a grain moisture meter means;
   (d) generating a grain moisture signal representative of the grain moisture content of said grain by means of said grain moisture meter means;
   (e) communicating said grain moisture signal to a grain dryer control means having said grain conveyor means, said air heater unit, and said grain moisture meter means interconnected thereto; and
   (f) controlling the speed of said grain conveyor means by said grain dryer control means in relation to the moisture content represented by said grain moisture siganal to thereby control the speed of movement of grain through said grain chamber means.

19. A method as set forth in claim 18 including the steps of:
   (a) entering a desired grain moisture content into said grain dryer control means; and
   (b) upon said grain moisture signal representing a grain moisture content which is not greater than said desired grain moisture content, controlling said grain conveyor means by said grain dryer control means to increase the rate of movement of grain through said grain chamber means.

20. A method as set forth in claim 18 wherein said air heater unit is interconnected with said dryer control means and including the steps of:
   (a) sensing the temperature of air heated by said air heater unit;
   (b) entering a desired drying air temperature into said control means; and
   (c) controlling the operation of said air heater unit by said dryer control means to normally maintain said desired drying air temperature.

21. A method as set forth in claim 18 including the steps of:
   (a) mechanically withdrawing a grain sample of grain from said grain chamber means;
   (b) measuring the grain moisture content of said grain sample; and
   (c) generating said grain moisture signal which represents the grain moisture content of said grain sample.

22. A method as set forth in claim 18 including the step of:
   (a) measuring the grain moisture content of grain which has been contacted by heated air from said air heater unit.

23. A grain drying apparatus comprising:
   (a) grain container means to contain a quantity of grain to be dried;
   (b) grain conveyor means to move grain into and out of said grain container means;
   (c) grain dryer means to communicate drying air to grain in said grain container means to dry said grain;
   (d) grain moisture meter means to measure the dielectric constant of said grain, convert the measured dielectric constant to a grain moisture content of said grain, and generate a grain moisture signal representing said grain moisture content; and
   (e) grain dryer control means having said grain conveyor means and said grain moisture meter means interconnected therewith; said control means controlling the drying of grain in said grain container means in relation to the grain moisture content represented by said grain moisture signal.

24. An apparatus as set forth in claim 23 wherein said grain dryer means includes:
   (a) air heater means operative to heat air prior to communication thereof to said grain container means.

25. An apparatus as set forth in claim 24 wherein said air heater means is interconnected with said grain dryer control means and including:

(a) an air temperature sensor positioned to sense the temperature of air heated by said air heater means and interconnected with said grain dryer control means; and (b) said grain dryer control means controlling the drying of said grain by controlling said air heater means to maintain a selected temperature in the air heated thereby.

26. An apparatus as set forth in claim 24 wherein said air heater means is interconnected with said grain dryer control means and including:

(a) a grain temperature sensor positioned in said grain container means to sense the temperature of grain therein and interconnected with said grain dryer control means; and (b) said grain dryer control means controlling the drying of said grain by controlling said air heater means to maintain a selected temperature in the air heated thereby.

27. An apparatus as set forth in claim 24 including:

(a) a grain temperature sensor positioned in said grain container means to sense the temperature of grain therein and interconnected with said grain dryer control means; and (b) said grain dryer control means controlling the drying of said grain by controlling the operation of said grain conveyor means to remove grain from said grain container means upon sensing a selected temperature of grain in said grain container means.

28. An apparatus as set forth in claim 24 wherein:

(a) said grain moisture meter means measures the grain moisture content of grain which has been contacted by heated air in said grain container means from said air heater means.

29. An apparatus as set forth in claim 23 wherein:

(a) said grain moisture meter means measures the grain moisture content of grain which has been contacted by drying air in said grain container means from said grain dryer means.

30. An apparatus as set forth in claim 23 wherein:

(a) said grain conveyor means is operative to continuously move grain through said grain container means;

(b) said grain conveyor means includes conveyor speed control means interconnected with said grain dryer control means; and (c) said grain dryer control means controls the drying of said grain by controlling, through said conveyor speed control means, the rate at which said grain conveyor means moves grain through said grain container means in relation to the grain moisture content represented by said grain moisture signal.

31. An apparatus as set forth in claim 23 wherein said grain moisture meter means includes:

(a) a grain sample cell to receive a grain sample of said grain, said sample cell being an electrical capacitor; and (b) a grain moisture meter interconnected between said sample cell and said grain dryer control means and operative to generate said grain moisture signal which has a property which is related to the dielectric constant of a grain sample in said sample cell.

32. An apparatus as set forth in claim 23 including:

(a) grain sampling means communicating with said grain container means and interconnected with said dryer control means whereby said sampling means withdraws grain from said grain container means, deposits same as a grain sample in said grain moisture meter means, and empties said grain sample from said meter means after the grain moisture content of said grain sample has been measured.

33. An apparatus as set forth in claim 32 wherein:

(a) said grain sampling means withdraws grain which has been contacted by drying air from said grain dryer means in said grain container means.

34. An apparatus to measure the grain moisture content of a grain sample comprising:

(a) a cylindrical conductive outer electrode having opposite ends, said outer electrode having an axis which is positioned vertically;

(b) a cylindrical conductive inner electrode having opposite ends and positioned coaxially within said outer electrode with the ends of said inner electrode in vertically spaced relation to the ends of said outer electrode to define an annular active region of a grain sample cell;

(c) nonconductive tubular wall means extending beyond the ends of said outer electrode and said active region of said sample cell at least to a distance such that when said sample cell is filled with a grain sample, said grain sample therein extends beyond electric field fringe regions at the ends of said inner and outer electrodes; and (d) grain moisture meter means connected across said inner and outer electrodes, operatively measuring the electrical capacitance between said electrodes, and generating a grain moisture signal having a signal property which represents the differnce between the capacitance of said sample cell with said grain sample therein and the capacitance of said sample cell when empty.

35. An apparatus as set forth in claim 34 including:

(a) grain sampling means communicating with a grain source of grain whose moisture content is to be measured, withdrawing grain from said grain source, depositing same as a grain sample in said sample cell, and emptying said grain sample from said sample cell after the grain moisture content of said grain sample has been measured.

36. An apparatus as set forth in claim 35 wherein said grain sampling means including:

(a) a grain sample conduit communicating with said grain source;

(b) blower means operative to generate a grain withdrawal airflow in said grain sample conduit to urge grain thereinto and move said grain toward said sample cell and to generate a sample cell emptying airflow to empty a grain sample from said sample cell;

(c) grain separator means between said sample conduit and said sample cell to separate said grain sample from said withdrawal airflow;

(d) sample cell valve means associated with said sample cell to control the entry of grain into said sample cell; and (e) a sample cell emptying conduit communicating with said sample cell to receive a grain sample which has been in said sample cell.

37. An apparatus as set forth in claim 36 wherein said sample cell valve means includes:

(a) a valve conduit communicating between said grain separator means and said sample cell;

(b) an air operated valve member positioned within said valve conduit and movable between an open position allowing grain flow through said valve conduit and a closed position preventing grain flow therethrough; and (c) a valve control conduit communicating with said blower means and said valve conduit and directed toward said valve member whereby, when said blower means is operating to move grain through said grain sample conduit, said valve member is placed in said closed position to accumulate a selected quantity of said grain in said grain separator means and said valve conduit and whereby, when said blower means is subsequently deactivated, said valve member is placed in said open position to allow said quantity of said grain to be deposited in said sample cell.

38. A grain dryer control system to control a grain dryer apparatus to dry grain to a selected grain moisture content comprising;
    (a) a grain dryer apparatus of which the drying rate of grain is controllable;
    (b) grain moisture meter means operative to measure the dielectric constant of a grain sample of grain associated with said dryer apparatus, to relate the measured dielectric constant of said grain to a grain moisture content of said grain, and to generate a grain moisture signal representative of said grain moisture content; and
    (c) grain dryer control computer means interfaced between said dryer apparatus and said grain moisture meter means and operative to control the drying rate of grain in said dryer apparatus in relation to the grain moisture content represented by said grain moisture signal.

39. A control system as set forth in claim 38 including:
    (a) grain sampling means communicating with said dryer apparatus, withdrawing grain from said dryer apparatus, depositing same as a grain sample in said grain moisture meter means, and emptying said grain sample from said grain moisture meter means after the grain moisture content of said grain sample has been measured.

40. A method of drying granular material including grain in a grain dryer apparatus including grain chamber means to contain grain, grain conveyor means to move grain into and out of said chamber means, a dryer air unit to communicate air to said chamber means to dry grain therein, grain moisture means to measure the moisture content of grain, and grain dryer control means having said grain conveyor means, said dryer air unit, and said grain moisture meter means interconnected thereto; said method comprising the steps of:
    (a) loading grain into a grain chamber means by means of grain conveyor means;
    (b) communicating air from a dryer air unit to said chamber means to dry said grain;
    (c) periodically measuring the grain moisture content of said grain by means of a grain moisture meter means;
    (d) generating a grain moisture signal representative of the grain moisture content of said grain by means of said grain moisture meter means;
    (e) communicating said grain moisture signal to a grain dryer control means having said grain conveyor means, said dryer air unit, and said grain moisture meter means interconnected thereto; and
    (f) controlling by said grain dryer control means the drying of said grain in said grain chamber means in relation to the moisture content represented by said grain moisture signal by controlling the length of time that grain within said grain chamber means receives air from said dryer air unit by the steps of:
        (1) calculating a grain drying time period based on the measured grain moisture content; and
        (2) removing grain from said grain chamber means by said grain conveyor means upon the expiration of said grain drying time period.

41. A method as set forth in claim 40 including the steps of:
    (a) measuring the grain moisture content of grain which has been within said grain chamber means a selected interval of time after the communication of drying air to said grain chamber means has begun; and
    (b) altering the length of said grain drying time period in relation to the later measured grain moisture content.

42. A method of drying granular material including grain in a grain dryer apparatus including grain chamber means to contain grain, grain conveyor means to move grain into and out of said chamber means, a dryer air unit to communicate air to said chamber means to dry grain therein, grain moisture means to measure the moisture content of grain, and grain dryer control means having said grain conveyor means, said dryer air unit, and said grain moisture meter means interconnected thereto; said method comprising the steps of:
    (a) loading grain into a grain chamber means by means of grain conveyor means;
    (b) communicating air from a dryer air unit to said chamber means to dry said grain;
    (c) periodically measuring the grain moisture content of said grain by means of a grain moisture meter means;
    (d) generating a grain moisture signal representative of the grain moisture content of said grain by means of said grain moisture meter means;
    (e) communicating said grain moisture signal to a grain dryer control means having said grain conveyor means, said dryer air unit, and said grain moisture meter means interconnected thereto; and
    (f) controlling by said grain dryer control means the drying of said grain in said grain chamber means in relation to the moisture content represented by said grain moisture signal by controlling the length of time that grain within said grain chamber means receives air from said dryer air unit by the steps of:
        (1) continuously moving grain through said grain chamber means by said grain conveyor means;
        (2) calculating a grain drying time period based on the measured grain moisture content; and
        (3) controlling the speed of said grain conveyor means in such a manner as to cause grain to remain in said grain chamber means for said grain drying time period.

43. A method as set forth in claim 42 including the steps of:
    (a) measuring the moisture content of grain which has been within said grain chamber means a selected interval of time after the communication of drying air to said grain chamber means has begun; and
    (b) altering the length of said grain drying time period in relation to the later measured grain moisture content.

44. A method of drying granular material including grain in a grain dryer apparatus including grain chamber means to contain grain, grain conveyor means to move grain into and out of said chamber means, a dryer air unit to communicate air to said chamber means to dry grain therein, grain moisture means to measure the moisture content of grain, and grain dryer control means having said grain conveyor means, said dryer air unit, and said grain moisture meter means interconnected thereto; said method comprising the steps of:

(a) loading grain into a grain chamber means by means of grain conveyor means;

(b) communicating air from a dryer air unit to said chamber means to dry said grain;

(c) periodically measuring the grain moisture content of said grain by means of a grain moisture meter means by mechanically withdrawing a grain sample of grain from said grain chamber means by the steps of:

(1) establishing a grain withdrawal airflow between said grain chamber means and said grain moisture meter;

(2) entraining said grain sample in said withdrawal airflow;

(3) separating said grain sample from said withdrawal airflow;

(4) depositing the separated grain sample in said grain moisture meter means;

(5) measuring the grain moisture content of said grain sample by means of said grain moisture meter means;

(6) generating a grain moisture signal which represents the grain moisture content of said grain sample by means of said grain moisture meter means;

(7) establishing a grain return airflow operatively communicating with said grain moisture meter means and;

(8) entraining said grain sample in said return airflow after measuring the grain moisture content thereof to empty said grain sample from said grain moisture meter means;

(d) communicating said grain moisture signal to a grain dryer control means having said grain conveyor means, said dryer air unit, and said grain moisture meter means interconnected thereto; and (e) controlling by said grain dryer control means the drying of said grain in said grain chamber means in relation to the moisture content represented by said grain moisture signal.

45. A method of drying granular material including grain in a grain dryer apparatus including grain chamber means to contain grain, grain conveyor means to move grain into and out of said chamber means, a dryer air unit including air heater means to communicate air to said chamber means to dry again therein, grain moisture means to measure the moisture content of grain, and grain dryer control means having said grain conveyor means, said dryer air unit, and said grain moisture meter means interconnected thereto; said method comprising the steps of:

(a) loading grain into a grain chamber means by means of grain conveyor means;

(b) entering a desired drying air temperature into a grain dryer control means having said grain conveyor means, a dryer air unit including an air heater means, and a grain moisture meter means interconnected thereto;

(c) heating said air by said air heater means;

(d) sensing the temperature of air heated by said air heater means;

(e) controlling the operation of said air heater means by said dryer control means to normally maintain said desired drying air temperature;

(f) communicating the heated air from said dryer air unit to said chamber means to dry said grain;

(g) entering a desired grain moisture content into said grain dryer control means;

(h) periodically measuring the grain moisture content of said grain by means of said grain moisture meter means;

(i) generating a grain moisture signal representative of the grain moisture content of said grain by means of said grain moisture meter means;

(j) communicating said grain moisture signal to said grain dryer control means; and (k) controlling by said grain dryer control means the drying of said grain in said grain chamber means in relation to the moisture content represented by said grain moisture signal by the steps of:

(1) averaging, by said grain dryer control means, each grain moisture content reading with a selected number of previous grain moisture content readings resulting in an average grain moisture content; and (2) upon said grain moisture signal representing a grain moisture content wetter than said desired grain moisture content and the current average grain moisture content being not greater than said desired grain moisture content, controlling said air heater means to maintain a drying air temperature which is warmer than said desired drying air temperature by a selected temperature increment.

46. A method of continuously drying granular material including grain in a grain dryer apparatus including grain chamber means through which grain is moved to be dried, grain conveyor means to urge grain through said chamber means, an air heater unit to communicate heated air to said chamber means to dry grain therein, grain moisture means to measure the moisture content of grain, and grain dryer control means having said grain conveyor means, said air heater unit, and said grain moisture meter means interconnected thereto; said method comprising the steps of:

(a) continuously moving grain through a grain chamber means by means of grain conveyor means;

(b) entering a desired drying air temperature into a grain dryer control means having said grain conveyor means, an air heater unit, and a grain moisture meter means interconnected thereto;

(c) sensing the temperature of air heated by said air heater unit;

(d) controlling the operation of said air heater unit by said dryer control means to normally maintain said desired drying air temperature;

(e) communicating air from said air heater unit to said chamber means to dry said grain;

(f) entering a desired grain moisture content into said grain dryer control means;

(g) periodically measuring the grain moisture content of said grain by means of said grain moisture meter means;

(h) generating a grain moisture signal representative of the grain moisture content of said grain by means of said grain moisture meter means;

(i) communicating said grain moisture signal to said grain dryer control means;

(j) controlling the speed of said grain conveyor means by said grain dryer control means in relation to the moisture content represented by said grain moisture signal to thereby control the speed of movement of grain through said grain chamber means;

(k) averaging, by said grain dryer control means, each grain moisture content reading with a selected number of previous grain moisture content readings resulting in an average grain moisture content; and (l) upon said grain moisture signal representing a grain moisture content wetter than said desired grain moisture content and the current average grain moisture content being not greater than said desired grain moisture content, controlling said air heater unit to maintain a drying air temperature which is warmer than said desired drying air temperature by a selected temperature increment.

47. A method of continuously drying granular material including grain in a grain dryer apparatus including grain chamber means through which grain is moved to be dried, grain conveyor means to urge grain through said chamber means, an air heater unit to communicate heated air to said chamber means to dry grain therein, grain moisture means to measure the moisture content of grain, and grain dryer control means having said grain conveyor means, said air heater unit, and said grain moisture meter means interconnected thereto; said method comprising the steps of:

(a) continuously moving grain through a grain chamber means by means of grain conveyor means;

(b) communicating air from an air heater unit to said chamber means to dry said grain;

(c) periodically measuring the grain moisture content of said grain by means of a grain moisture meter means by mechanically withdrawing a grain sample of grain from said grain chamber means by the steps of:
  (1) establishing a grain withdrawal airflow between the grain chamber means and said grain moisture meter means;
  (2) entraining said grain sample in said withdrawal airflow;
  (3) separating said grain sample from said withdrawal airflow;
  (4) depositing the separated grain sample in said grain moisture meter means;
  (5) measuring the grain moisture content of said grain sample by means of said grain moisture meter means;
  (6) generating a grain moisture signal which represents the grain moisture content of said grain sample by means of said grain moisture meter means;
  (7) establishing a grain return airflow operatively communicating with said grain moisture meter means; and
  (8) entraining said grain sample in said return airflow after measuring the grain moisture content thereof to empty said grain sample from said grain moisture meter means;

(d) communicating said grain moisture signal to a grain dryer control means having said grain conveyor means, said air heater unit, and said grain moisture meter means interconnected thereto; and (e) controlling the speed of said grain conveyor means by said grain dryer control means in relation to the moisture content represented by said grain moisture signal to thereby control the speed of movement of grain through said grain chamber means.

48. A method as set forth in claim 47 wherein said grain moisture meter includes an airflow operated grain valve and including the steps of:

(a) establishing a valving airflow to support an airflow operated grain valve within said grain moisture meter means at substantially the same time that said grain withdrawal airflow occurs to prevent grain from being deposited in said grain moisture meter means for a selected time interval and thereby accumulate a grain sample of a selected quantity; and (b) ceasing said valving airflow after said selected time interval to allow said grain sample to be deposited in said grain moisture meter means.

49. A grain drying apparatus comprising:

(a) grain container means to contain a quantity of grain to be dried;

(b) grain conveyor means to move grain into and out of said grain container means;

(c) grain dryer means to communicate drying air to grain in said grain container means to dry said grain;

(d) grain moisture meter means to measure the grain moisture content of said grain and generate a grain moisture signal representing said grain moisture content;

(e) said grain moisture meter means including:
  (1) a grain sample cell to receive a grain sample of said grain, said sample cell being an electrical capacitor; and
  (2) a grain moisture meter interconnected between said sample cell and said grain dryer control means and operative to generate said grain moisture signal which has a property which is related to the dielectric constant of a grain sample in said sample cell;

(f) said sample cell including:
  (1) a cylinderical conductive outer electrode having opposite ends, said outer electrode having an axis which is positioned vertically;
  (2) a cylindrical conductive inner electrode having opposite ends and positioned coaxially within said outer electrode with the ends of said inner electrode in vertically spaced relation to the ends of said outer electrode to define a annular active region of said sample cell; and
  (3) nonconductive wall means extending beyond the ends of said outer electrode and said active region of said sample cell at least to a distance such that when said sample cell is filled, the grain sample therein extends beyond electric field fringe regions at the ends of said inner and outer electrodes; and (g) grain dryer control means having said grain conveyor means, said grain dryer means, and said grain moisture meter means interconnected therewith; said control means controlling the drying of grain in said grain container means in relation to the grain moisture content represented by said grain moisture signal.

50. A grain drying apparatus comprising:

(a) grain container means to contain a quantity of grain to be dried;

(b) grain conveyor means to move grain into and out of said grain container means;

(c) grain dryer means to communicate drying air to grain in said grain container means to dry said grain;

(d) grain moisture meter means to measure the grain moisture content of said grain and generate a grain moisture signal representing said grain moisture content;

(e) grain dryer control means having said grain conveyor means, said grain dryer means, and said grain moisture meter means interconnected therewith; said control means controlling the drying of grain in said grain container means in relation to the grain moisture content represented by said grain moisture signal; and (f) grain sampling means communicating with said grain container means and interconnected with said dryer control means whereby said sampling means withdraws grain from said grain container means, deposits same as a grain sample in said grain moisture meter means, and empties said grain sample from said meter means after the grain moisture content of said grain sample has been measured, said grain sampling means including:

(1) a grain sample conduit communicating with said grain container means;

(2) blower means interconnected with said grain dryer control means, communicating with said grain sample conduit, operative to generate a grain withdrawal airflow in said grain sample conduit to urge grain thereinto and move said grain toward said sample cell, and operative to generate a sample cell emptying airflow to empty a grain sample from said sample cell;

(3) grain separator means between said sample conduit and said sample cell to separate said grain sample from said withdrawal airflow;

(4) sample cell valve means associated with said sample cell to control the entry of grain into said sample cell; and (5) a sample cell emptying conduit communicating with said sample cell and said sample cell emptying airflow to receive a grain sample which has been in sample cell.

51. An apparatus as set forth in claim 50 wherein said sample cell valve means includes:

(a) a valve conduit communicating between said grain separator means and said sample cell;

(b) an air operated valve member positioned within said valve conduit and movable between an open position allowing grain flow through said valve conduit and a closed position preventing grain flow therethrough; and (c) a valve control conduit communicating with said blower means and said valve conduit and directed toward said valve member whereby, when said blower means is operating to move grain through said grain sample conduit, said valve member is placed in said closed position to accumulate a selected quantity of said grain in said grain separator means and said valve conduit and whereby, when said blower means is subsequently deactivated, said valve member is placed in said open position to allow said quantity of said grain to be deposited in said sample cell.

52. In a method of drying grain in a grain dryer apparatus including grain dryer chamber means for holding grain, grain conveyor means to urge grain into and out of said chamber means, a heater unit to communicate heated air to said chamber means to dry said grain, grain moisture meter means for measuring the moisture content of said grain, and dryer control means having said grain conveyor means and said moisture meter means interconnected thereto; said method including conveying grain into said chamber means and communicating heated air thereto to dry said grain; the improvement comprising the steps of:

(a) periodically measuring, by said grain moisture meter means, the moisture content of the grain in close proximity to the location at which the heated air first communicates with the grain;

(b) generating a grain moisture signal representative of the moisture content of said grain in close proximity to the location at which the heated air first communicates with the grain by said moisture meter means;

(c) communicating said grain moisture signal to said control means; and (d) controlling the operation of said grain conveyor means by said control means in response to the moisture content represented by said grain moisture signal such that grain dried near a preselected moisture content is conveyed away from said location at which the heated air first communicates with the grain.

53. A method of drying grain comprising the steps of:

(a) providing a grain drying bin, bin loading means, and bin unloading means;

(b) loading a quantity of grain into said bin;

(c) communicating heated air to said bin to dry the grain therein;

(d) periodically, mechanically withdrawing grain from said bin near where said heated air is communicated to said grain;

(e) measuring the moisture content of the grain withdrawn from said bin;

(f) generating a grain moisture signal representative of the measured moisture content of said grain withdrawn from said bin;

(g) communicating said grain moisture signal to said bin unloading means; and (h) activating said unloading means to unload grain from said bin in response to selected grain moisture content represented by said grain moisture signal.

54. A grain dryer apparatus for drying granular material including grain and comprising:

(a) grain chamber means to contain grain;

(b) grain conveyor means to move grain into and out of said grain chamber means;

(c) a dryer air unit to communicate air to said chamber means to dry grain therein;

(d) grain moisture means to measure the moisture content of said grain and to generate a grain moisture signal representative of the grain moisture content of said grain; and (e) grain dryer control means having said grain conveyor means, said dryer air unit, and said grain moisture meter means interconnected thereto, said control means controlling the drying of grain in said grain chamber means in relation to the moisture content represented by said grain moisture signal by controlling the length of time that grain within said grain chamber means receives air from said dryer air unit by calculating a grain drying time period based on the measured grain moisture content and removing grain from said grain chamber means by said grain conveyor means upon the expiration of said grain drying time period.
55. An apparatus as set forth in claim 54 wherein:
(a) said dryer control means is operative to cause the measurement of the grain moisture content of grain which has been within said grain chamber means a selected interval of time after the communication of drying air to said grain chamber means has begun and which alters the length of said grain drying time period in relation to the later measured grain moisture content.

* * * * *